US011196939B2

United States Patent
Hsieh et al.

(10) Patent No.: US 11,196,939 B2
(45) Date of Patent: Dec. 7, 2021

(54) GENERATING LIGHT PAINTING IMAGES FROM A SEQUENCE OF SHORT EXPOSURE IMAGES

(71) Applicant: ADOBE INC., San Jose, CA (US)

(72) Inventors: Chih-Yao Hsieh, San Jose, CA (US); Sylvain Paris, Jamaica Plain, MA (US); Seyed Morteza Safdarnejad, San Jose, CA (US); Gregg Wilensky, San Francisco, CA (US)

(73) Assignee: ADOBE INC., San Jose, CA (US)

(*) Notice: Subject to any disclaimer, the term of this patent is extended or adjusted under 35 U.S.C. 154(b) by 0 days.

(21) Appl. No.: 16/876,663

(22) Filed: May 18, 2020

(65) Prior Publication Data

US 2020/0280670 A1  Sep. 3, 2020

Related U.S. Application Data

(62) Division of application No. 16/149,904, filed on Oct. 2, 2018, now Pat. No. 10,701,279.

(51) Int. Cl.
*H04N 5/235* (2006.01)
*H04N 5/232* (2006.01)
*G06T 7/246* (2017.01)

(52) U.S. Cl.
CPC .......... *H04N 5/2356* (2013.01); *G06T 7/246* (2017.01); *H04N 5/2353* (2013.01);
(Continued)

(58) Field of Classification Search
CPC .. H04N 5/2356; H04N 5/2355; H04N 5/2354; H04N 5/2353; H04N 5/23254; G06T 7/246
See application file for complete search history.

(56) References Cited

U.S. PATENT DOCUMENTS 5,751,376 A   5/1998   Hirai
7,702,131 B2  4/2010   Chinen et al.
(Continued)

OTHER PUBLICATIONS

Y. Chen, Z. Tang and K. Ma, "LightPainter: Creating Long-Exposure Imagery from Videos," in IEEE Computer Graphics and Applications, vol. 38, No. 4, pp. 27-36, Jul./Aug. 2018, doi: 10.1109/MCG.2018.042731656. (Year: 2018).*
(Continued)

*Primary Examiner* — Timothy J Henn
(74) *Attorney, Agent, or Firm* — Keller Jolley Preece

(57) ABSTRACT

This disclosure relates to methods, non-transitory computer readable media, and systems that generate a virtual long exposure image from a sequence of short exposure images portraying a moving object. In various embodiments, the image transformation system aligns two digital images in the sequence of short exposure images. The image transformation system can determine a motion vector path for the moving object between the first digital image and the second digital image. The image transformation system can also blend pixels along the motion vector path to generate a blended image representative of the motion of the moving object between the first digital image and the second digital image. The image transformation system can generate additional blended images based on consecutive pairs of images in the sequence of digital images and generates a virtual long exposure image by combining the first blended image with the additional blended images.

20 Claims, 13 Drawing Sheets

(52) U.S. Cl.
CPC ......... *H04N 5/2354* (2013.01); *H04N 5/2355* (2013.01); *H04N 5/23254* (2013.01)

(56) References Cited

U.S. PATENT DOCUMENTS

| | | |
|---|---|---|
| 9,836,831 B1 | 12/2017 | Krishnaswamy et al. |
| 2009/0079836 A1 | 3/2009 | Mishima et al. |
| 2009/0208062 A1 | 8/2009 | Sorek et al. |
| 2010/0157072 A1 | 6/2010 | Luo et al. |
| 2010/0265357 A1 | 10/2010 | Liu et al. |
| 2012/0133797 A1* | 5/2012 | Sato ................ H04N 5/2354 348/239 |
| 2014/0111662 A1 | 4/2014 | Mashiah |
| 2014/0347521 A1 | 11/2014 | Hasinoff et al. |
| 2016/0037060 A1 | 2/2016 | Lim et al. |
| 2019/0213712 A1 | 7/2019 | Shoa Hassani et al. |
| 2019/0251683 A1 | 8/2019 | Safdarnejad et al. |
| 2019/0279378 A1 | 9/2019 | Takahashi |
| 2020/0106945 A1 | 4/2020 | Hsieh et al. |

OTHER PUBLICATIONS

U.S. Appl. No. 16/149,904, Dec. 19, 2019, Preinterviev 1st Office Action.
U.S. Appl. No. 16/149,904, Feb. 24, 2020, Notice of Allowance.

* cited by examiner

GENERATING LIGHT PAINTING IMAGES FROM A SEQUENCE OF SHORT EXPOSURE IMAGES

CROSS-REFERENCE TO RELATED APPLICATIONS

The present application is a division of U.S. application Ser. No. 16/149,904, filed on Oct. 2, 2018. The aforementioned application is hereby incorporated by reference in its entirety.

BACKGROUND

Recent years have witnessed a significant increase in digital photography, particularly with the improvements and availability of digital cameras on mobile devices. Indeed, both hardware and software advances allow for incorporation of digital cameras within a large number of mobile computing devices, such as tablets, smartphones, and wearable devices. For instance, conventional digital photography systems now allow users to capture, modify, and utilize digital photographs in a variety of different contexts.

Notwithstanding these improvements, digital photography systems still have a number of significant shortcomings, particularly with respect to artistic photographs. For example, mobile devices often perform poorly when capturing long exposure photographs. In particular, mobile devices often lack the physical components (e.g., lenses, advanced sensors, and additional hardware) needed to capture clean, high-quality long exposure photographs, such as those captured using professional-grade cameras (e.g., DSLR cameras). In addition, many parameters and settings for capturing long exposure photographs, such as changing the ISO, shutter speed, or aperture, are limited or unavailable on many mobile devices.

Although some conventional digital photography systems operate on mobile devices and capture long exposure photographs, these conventional systems often produce inaccurate, blurry, and unsatisfactory results. Indeed, the slightest hand movement of the mobile device during a long exposure capture can distort the photograph. Thus, to achieve an acceptable long exposure photograph, an individual may have to use additional hardware, such as a tripod and a remote trigger. Unfortunately, this additional equipment is bulky, expensive, and often inaccessible to individuals when photograph opportunities arise.

To overcome these issues, some conventional systems have attempted to create long exposure photographs on mobile devices from still photographs. These conventional systems require an individual to capture a sequence of images. Based on the sequence of images, these systems create a long exposure photograph. Even these systems, however, suffer from a variety of problems. For example, in many instances, these conventional systems still require an individual to use a tripod (or other cumbersome equipment) while capturing images to obtain satisfactory results.

Moreover, these conventional systems often generate unrealistic, inaccurate long exposure photographs. Indeed, long exposure photographs generated by conventional systems often include noticeable artifacts (e.g., fail to provide a smooth trail for objects in motion across the digital images). For example, some conventional systems average frames from digital images captured in burst mode to generate long exposure photographs. This approach, however, causes the long exposure photograph to include unnatural pixel movements and textures (e.g., as a result of time gap between the captured images). These quality issues are often exacerbated when a moving object portrayed in the long exposure photograph is moving at high speeds.

In addition to problems with accuracy, conventional systems are also inflexible. For instance, in combining digital images, some conventional systems cannot adjust exposure settings. To illustrate, certain conventional systems cannot provide selection options for modifying length of long exposure capture. Similarly, many conventional systems require a specific output format (e.g., JPEG), which limits flexibility in utilizing the resulting long exposure image.

These shortcomings of conventional systems cause many photographers to utilize conventional cameras. However, in addition to the equipment problems discussed above, cameras have a number of problems in flexibility and functionality. For example, DSLR cameras require very specific conditions and lighting functions to capture particular types of long exposure photographs. For example, in order to create a long exposure photograph with an emphasized end-frame (i.e., rear-sync flash effect), conventional systems require the photographer to use a bright flash that can illuminate the object/scene reflected in the long exposure photograph. Accordingly, conventional systems can only generate a rear-sync flash long exposure image if the main subject is close enough to the camera to be lit by the flash (and in a relatively dark scene). Similarly, to create a digital image with light-painting effects, conventional cameras require a high-contrast in brightness (e.g., between a bright light and dark surrounding environment). Accordingly, conventional systems cannot generate a light-painting effect in an environment with background lighting or a light source that is not exceptionally bright.

These along with additional problems and issues exist with regard to generating realistic long exposure photographs.

SUMMARY

Embodiments of the present disclosure provide benefits and/or solve one or more of the foregoing or other problems in the art with systems, non-transitory computer-readable media, and methods that utilize robust alignment models and motion vector path blending to generate a long exposure image from a sequence of short exposure images. For instance, in one or more embodiments, the disclosed systems can selectively apply different alignment models to determine a relative alignment between images in a digital image sequence. Upon aligning the digital images, the disclosed systems can utilize a continuous-motion effect technique that renders accurate virtual long exposure images. In particular, for each pair of consecutive aligned frames, the disclosed systems can estimate apparent motion (e.g., a motion vector path) using a fast optical flow technique and then blur each pixel along the optical flow direction to create a smooth trail for moving objects.

To illustrate, in one or more embodiments, the disclosed systems determine an alignment between a first digital image and a second digital image in a sequence of digital images portraying a moving object. Specifically, the disclosed systems can selectively apply a pixel-adjusted-gyroscope-alignment model and a feature-based-alignment model to determine the alignment between the first digital image and the second digital image. Moreover, the disclosed systems can determine a motion vector path for the moving object based on the first digital image, the second digital image, and the alignment. Furthermore, in one or more embodiments, the disclosed systems generate a first blended digital image by blending pixels from the first digital image utilizing the motion vector path (e.g., averaging pixels that fall along the motion vector path). In addition, the disclosed systems can generate a virtual long exposure image portraying the moving object based on the first blended digital image (e.g., by combining the first blended digital image with other blended images).

The disclosed systems can resolve many of the shortcomings of conventional systems discussed above. In particular, in one or more embodiments the disclosed systems allow a user to generate a high-quality virtual long exposure image using a handheld mobile device or camera without the use of additional hardware or capabilities. The disclosed systems can also reduce the blurriness of long exposure photos captured without use of a tripod by using comprehensive alignment technology to align a series of images with respect to a reference-input image. Additionally, the disclosed systems can improve the quality of virtual long exposure images by reducing the number of noticeable artifacts (e.g., by estimating and blending a set of pixels for a moving object between frames) while allowing for flexible adjustment of exposure and formatting. The disclosed systems can also apply special effects such as rear-sync flash and light-painting to virtual long exposure photographs.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
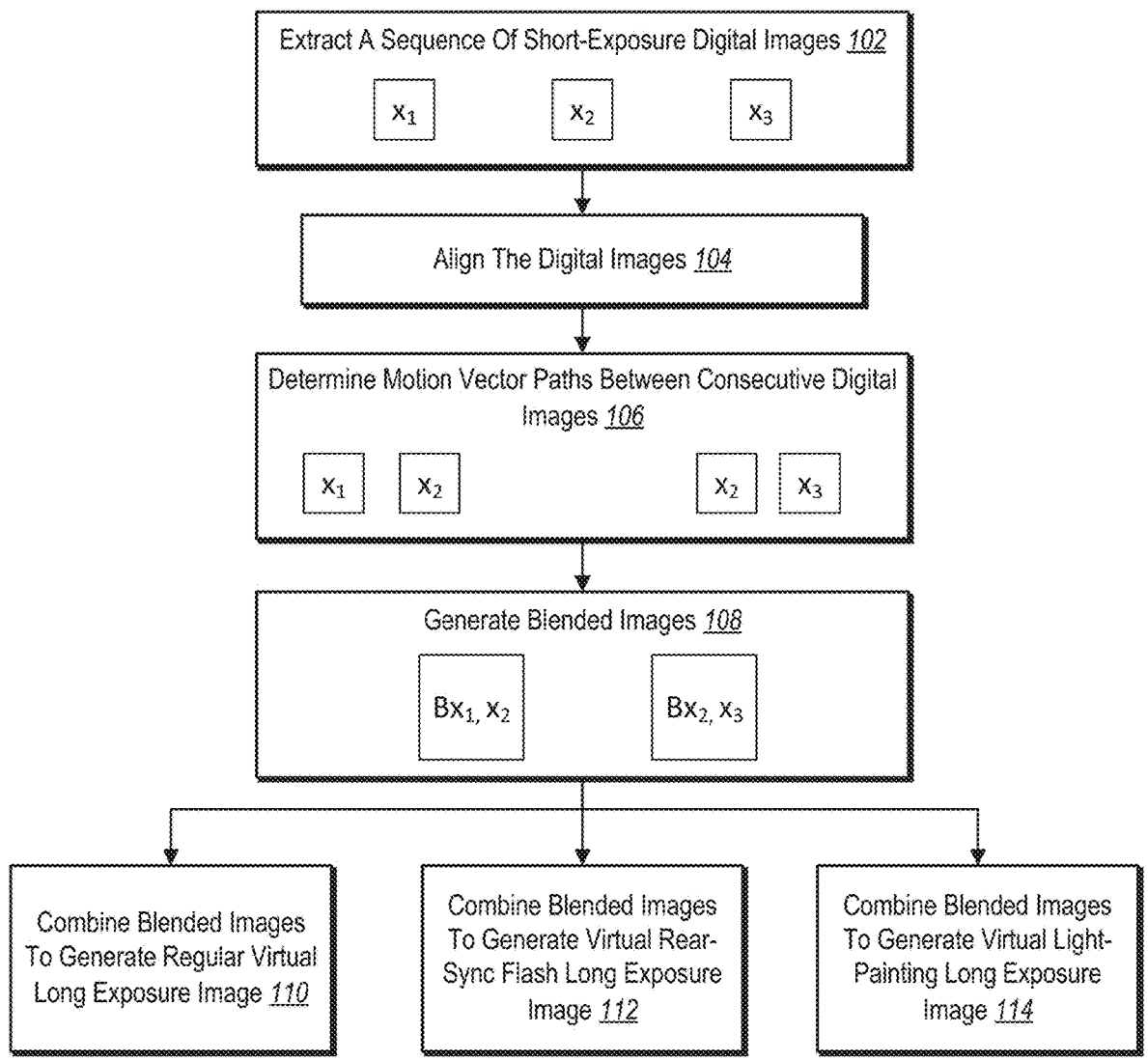
FIG. 1 illustrates a schematic diagram of utilizing an image transformation system to generate long exposure images from a sequence of short exposure digital images.

This disclosure describes one or more embodiments of an image transformation system that generates a virtual long exposure image from a sequence of short exposure digital images. In particular, the image transformation system can detect motion of objects portrayed within the digital images and create a smooth trail for moving pixels along the motion path. Specifically, in one or more embodiments the image transformation system uses comprehensive alignment technology to align a stack of images or frames (e.g., from a video) that portray one or more moving objects. Moreover, to create continuous-motion trails from the stack of aligned images, the image transformation system can use a fast optical flow technique to estimate apparent motion between each pair of consecutive aligned frames. In addition, in one or more embodiments, the image transformation system blurs each pixel along the optical flow direction to generate a virtual long exposure image that portrays a smooth trail for moving objects. Moreover, the image transformation system can also blur pixels to generate virtual long exposure images with special effects, such as virtual rear-sync flash long exposure images and/or virtual light-painting long exposure images.

To illustrate, the image transformation system can generate a virtual long exposure image portraying a moving object using a sequence of short exposure images. In one or more embodiments, the image transformation system aligns the sequence of short exposure images portraying a moving object including a first digital image and a consecutive second digital image. The image transformation system can determine a motion vector path for the moving object between the first digital image and the second digital image. As part of determining the motion vector path for the moving object, the image transformation system can determine the horizontal and vertical motion of each pixel within the moving object. In some embodiments, the image transformation system identifies a set of pixels along the motion vector path for each pixel and blends the set of pixels to generate a blended pixel. The image transformation system can use blended pixels to generate a virtual long exposure image (e.g., in which the motion path of the moving object is blurred).

As mentioned above, the image transformation system can efficiently and accurately align the sequence of images with respect to a reference-input image. For example, in one or more embodiments, the image transformation system determines a feature-point-deficiency metric and selects an alignment model based on the feature-point deficiency metric. In particular, the image transformation system can dynamically select an image-alignment model from a pixel-adjusted-gyroscope-alignment model and a feature-based-alignment model based on a feature-point-deficiency metric. The image transformation system can use the aligned series of images to produce a clear virtual long exposure image, even for a series of short exposure images captured without the use of a tripod.

As discussed, the image transformation system blends pixels along a motion vector path across digital images to generate a blended image. In one or more embodiments, the image transformation system blends pixels for each consecutive pair of digital images in a sequence of digital images. In particular, for each consecutive pair of digital images, the image transformation system can determine a motion vector path for each pixel (e.g., each pixel of a moving object). Moreover, the image transformation system can identify a set of pixels from the first digital image along the motion vector path from the first pixel. The image transformation system can generate a blended pixel (e.g., a blended pixel for the first pixel) by aggregating or blending the set of pixels along the motion vector path. In this manner, the image transformation system can generate blended pixels for each pixel location in the first digital image to generate a blended image. The blended image thus comprises blended pixels reflecting motion between the first digital image and the second digital image.

The image transformation system can also utilize blended images to generate a virtual long exposure image. For example, in one or more embodiments, the image transformation system generates a series of blended images that comprise blended pixels from consecutive digital images. The image transformation system can generate a virtual long exposure image by combining the blended images (and blended pixels). In this manner, the image transformation system can generate a virtual long exposure image that includes a smooth trail for moving objects portrayed within a sequence of digital images.

As mentioned above, the image transformation system can also generate different types of long exposure images. For instance, the image transformation system can generate a virtual rear-sync flash long exposure image using a sequence of short exposure images. In at least one embodiment, the image transformation system generates virtual rear-sync flash long exposure images without the requirement of slow shutter speeds and physical flashes. In particular, in one or more embodiments, the image transformation system identifies the last digital image (e.g., the virtual flash frame) in a sequence of digital images. The image transformation system can modify pixels in the last digital image to generate a modified flash frame in which the pixels are weighted by pixel brightness (e.g., the main subject in the virtual flash frame is emphasized based on brightness). Additionally, the image transformation system can generate a set of modified blended images by modifying pixels in the set of blended images based on brightness of the virtual flash frame. In one or more embodiments, the image transformation combines the modified flash frame with the modified blended images to generate a virtual rear-sync flash long exposure image.

The image transformation system can also generate virtual light-painting long exposure images. In one or more embodiments, the image transformation system generates a virtual light-painting long exposure image by selecting the brightest pixel at each pixel location across the series of blended images. The image transformation system can generate the virtual light-painting long exposure image by using the brightest pixel at each location. For example, if in one blended image, a light passes through a particular pixel in any blended image, the image transformation system uses the brightness of the lighted pixel in the final virtual light-painting long exposure image. Thus, in at least one embodiment, the image transformation system creates an image that includes a trail of light through all pixel locations through which the brightest light source has passed.

The image transformation system provides many advantages and benefits over conventional systems and methods. For example, by aligning the sequence of digital images, the image transformation system improves accuracy in generating long exposure photographs. Specifically, though conventional systems require the use of additional hardware such as tripods and remote triggers, the image transformation system uses comprehensive alignment technology to align all the photos in a sequence of digital images. Moreover, by utilizing a feature-point-deficiency-metric, the image transformation system can select an accurate and efficient alignment model specific to the features of particular digital images. In particular, the image transformation system can dynamically select an image-alignment model from a pixel-adjusted-gyroscope-alignment model and a feature-based-alignment model based on a feature-point-deficiency metric.

Additionally, the image transformation system improves accuracy and realism relative to conventional systems. For example, by determining motion vector paths for the moving object between sequential pairs of digital images and blurring pixels located in the motion vector path, the image transformation system helps reduce and/or eliminate image artifacts and inconsistencies. In particular, because the image transformation system can aggregate pixel values for pixels in the motion vector path, the image transformation system eliminates many gaps and artifacts present in images generated by conventional systems.

The image transformation system also improves flexibility relative to conventional systems. For example, the image transformation system can virtually alter the exposure time by adjusting the range of blended images used to generate the virtual long exposure image. The image transformation system also provides additional flexibility by supporting JPEG and DNG output formats, which is more suitable for advanced users. Moreover, the image transformation system provides increased flexibility by generating virtual rear-sync flash long exposure images and/or virtual light-painting long exposure images in a variety of different environments or lighting conditions (e.g., without a flash or without dark backgrounds).

As illustrated by the foregoing discussion, the present disclosure utilizes a variety of terms to describe features and advantages of the image transformation system. Before describing the image transformation system with reference to figures below, additional detail is now provided regarding the meaning of such terms. For example, as used herein, the term "image" or "digital image" refers to a digital symbol, picture, icon, or illustration. In particular, a digital image can include a digital graphics file that when rendered displays one or more objects. For instance, the term "image" can comprise a digital file that includes one or more subject objects and/or background scenery. For example, the term digital image includes digital files with the following file extensions: JPG, TIFF, BMP, PNG, RAW, or PDF.

As used herein, the term "sequence of digital images" refers to a series of digital images (e.g., of a images of a common scene or object in sequential order according to time). In particular, sequence of digital images refers to a series of input short exposure digital images. For example, the sequence of digital images can portray a moving object. The image transformation system can extract a sequence of digital images from a video or can directly receive the input sequence of digital images. Based on the sequence of short exposure digital images, the image transformation system generates a virtual long exposure image.

As used herein, the term "motion vector path" refers to an indication of a change in position between a first digital image and a second digital image. In particular, a motion vector path includes a data related to the movement and/or direction of pixels between consecutive short exposure digital images. For example, in a consecutive pair of digital images within a sequence of images, the image transformation system can determine a motion vector path reflecting horizontal and vertical movement of pixels portraying a moving object from a first digital image to a second digital image. As described below, the image transformation system identifies pixels along the motion vector path and averages pixel values for those pixels to generate blended pixels. Moreover, using the blended pixels, the image transformation system can generate a blended image including a continuous motion trail for the moving object between the first digital image and the second digital image.

As used herein, the term "blended image" refers to an image containing blended pixels. In particular, the blended image includes a blurry representation of a moving object in a first digital image and the corresponding moving object in a second digital image. The image transformation system can generate a blended image for each consecutive pair of digital images in a sequence of digital images. The image transformation system can use the generated blended images to generate virtual long exposure images.

As used herein, the term "virtual long exposure image" refers to a long exposure image generated using a plurality of digital images (e.g., a plurality of short exposure digital images rather than a single long exposure image). In particular, the virtual long exposure image comprises an image generated from a plurality of digital images portraying a moving object, in which the moving object leaves a visible trail. As discussed above, the image transformation system can generate various types of virtual long exposure images, including virtual light-painting long exposure images, and virtual rear-sync flash long exposure images. The term "virtual light-painting long exposure image" refers to a virtual long exposure image that emphasizes moving light objects (thus creating an effect that the light paints a path on the digital image). The term "virtual rear-sync flash long exposure image" refers to digital images that emphasize the subject (e.g., bright objects) of one digital image in a sequence of digital images (e.g., emphasizes the last digital image in a sequence). Additional detail regarding virtual long exposure images is provided below.

As used in this disclosure, the term "feature-based-alignment model" refers to an image-alignment model that aligns an input image with a reference-input image based on feature points within the input image and the reference-input image. In some embodiments, a feature-based-alignment model includes an algorithm that identifies and matches feature points between an input image and a reference-input image to align the input image with the reference-input image. For instance, in some embodiments, the image transformation system applies a feature-based-alignment model by executing a Random Sample Consensus ("RANSAC") algorithm, Least Median of Square ("LMedS") regression algorithm, or other suitable robust-model estimation algorithms to generate feature-alignment parameters and align an input image with a reference-input image based on the feature-alignment parameters. This disclosure further describes a feature-based-alignment model with reference to FIG. 2 below.

The term "feature-alignment parameters" refers to one or more factors that relate feature points from one digital image to corresponding feature points from another digital image. In some embodiments, for instance, feature-alignment parameters include factors that, when applied to a first digital image, align the first digital image with a second digital image based on matching feature points between the first and second digital images. Feature-alignment parameters may be homography-transformation parameters or affine-transformation parameters. Accordingly, in some embodiments, the image transformation system uses feature-alignment parameters expressed as a matrix relating matching feature points.

As further used in this disclosure, the term "pixel-adjusted-gyroscope-alignment model" refers to an image-alignment model that aligns a digital image with another digital image based on gyroscope datasets corresponding to the digital images and pixel-to-pixel comparison between the digital images. In some embodiments, a pixel-adjusted-gyroscope-alignment model comprises an image-alignment algorithm that aligns an input image with a reference-input image based on pixel-based-alignment parameters and gyroscope-alignment parameters. In some such cases, the image transformation system uses pixel-based-alignment parameters to adjust or modify gyroscope-alignment parameters. This disclosure further describes a pixel-adjusted-gyroscope-alignment model with reference to FIG. 2 below.

Relatedly, the term "pixel-adjusted-gyroscope-alignment parameters" refers to one or more indicators that relate an input image to a reference-input image based on gyroscope data and individual-pixel comparison between the input image and the reference-input image. In some embodiments, for instance, pixel-adjusted-gyroscope-alignment parameters include factors that, when applied to a first digital image, align a first digital image with a second digital image based on both pixel-based-alignment parameters and gyroscope-alignment parameters. Further, the term "gyroscope-alignment parameters" refers to one or more indicators that relate an input image to a reference-input image based on gyroscope datasets. For instance, gyroscope-alignment parameters include transformation parameters that relate a gyroscope dataset corresponding to one digital image to a gyroscope dataset corresponding to another digital image. In some embodiments, for instance, gyroscope-alignment parameters include a matrix that, when applied to a first digital image, align the first digital image with a second digital image based on a focal length of a camera and a relative rotation between the input image and the reference-input image indicated by gyroscope datasets corresponding to the first and second digital images. Both pixel-adjusted-gyroscope-alignment parameters and gyroscope-alignment parameters may be homography-transformation parameters or (in some cases) affine-transformation parameters. Accordingly, in some embodiments, the image transformation system uses pixel-adjusted-gyroscope-alignment parameters or gyroscope-alignment parameters expressed as a matrix relating an input image and a reference-input image.

As suggested above, in some embodiments, the image transformation system uses a pixel-based-alignment model (instead of a pixel-adjusted-gyroscope-alignment model) as an option for an image-alignment model from which to select. As used in this disclosure, the term "pixel-based-alignment model" refers to an image-alignment model that aligns a digital image with another digital image based on pixel-to-pixel comparison between the digital images. In some embodiments, a pixel-based-alignment model comprises pixel-by-pixel error analysis (e.g., sum of squared differences, sum of absolute differences, root mean squared intensity pixel error, normalized cross-correlation), hierarchical motion estimation, or Fourier-based alignment of digital images.

As used in this disclosure, the term "gyroscope dataset" refers to gyroscope readings corresponding to a device utilized to capture a digital image. In some embodiments, a gyroscope dataset refers to a gyroscope reading (e.g., angular momentum around each axis) captured by a gyroscope sensor or inertial measurement unit ("IMU") at the time a camera captures a digital image. The image transformation system may refer to, store, or use a gyroscope dataset in a particular format. For instance, the image transformation system may use a gyroscope dataset stored as Euler angles (e.g., proper Euler angles or Tait-Bryan angles) and rotation data (e.g., rotational velocities) or stored as quaternions. In either case, the image transformation system may present such gyroscope datasets in a gyroscope data matrix, such as a rotation matrix for gyroscope readings.

Referring now to the figures, FIG. 1 provides an overview of utilizing an image transformation system to generate various types of virtual long exposure images from a sequence of short exposure digital images. In particular, FIG. 1 illustrates a series of acts 100. As shown, the image transformation system performs act 102 of extracting a sequence of short exposure digital images. For example, the image transformation system extracts three short exposure digital images (shown as "$x_1$," "$x_2$," and "$x_3$"). The series of short exposure digital images portray a moving object. In each of the images $x_1$, $x_2$, and $x_3$, the moving object may occupy different pixel locations. In at least one embodiment, the image transformation system extracts the sequence of short exposure digital images based on a still video. In particular, the image transformation system can take snapshots of the still video at certain intervals of time. Each of the snapshots represents one of the digital images in the sequence of digital images.

In alternative embodiments, the image transformation system receives a sequence of short-exposure digital images. For example, the image transformation system can retrieve a sequence of short-exposure digital images from a camera that has used a burst capture mode. The burst capture mode of a handheld mobile device or camera can be used to capture a group of images in rapid succession (e.g., at four frames per second or greater). Thus, the image transformation system can receive a sequence of short-exposure images.

As shown in FIG. 1, the image transformation system performs an act 104 of aligning the digital images. In particular, the image transformation system utilizes one or more alignment models to align each of the images $x_1$, $x_2$, and $x_3$. In relation to FIG. 1, the image transformation system aligns each of the short exposure digital images with respect to a reference-input image. Additional detail regarding aligning the digital images is provided below in connection with FIG. 2.

As shown in FIG. 1, the image transformation system performs an act 106 of determining motion vector paths between consecutive digital images. As part of determining the motion vector paths between consecutive digital images 106, the image transformation system identifies consecutive pairs of digital images of the sequence of short exposure digital images. As illustrated, the image transformation system identifies a first pair of the consecutive digital images $x_1$ and $x_2$. The image transformation system also identifies a second pair of consecutive digital images $x_2$ and $x_3$. Each consecutive pair of digital images comprises a first digital image and a second digital image. As illustrated, $x_1$ is the first digital image of the first pair and $x_2$ is the first digital image of the second pair. $x_2$ is the second digital image of the first pair while $x_3$ is the second digital image of the second pair. As illustrated, the image transformation system determines a first motion vector path (or first set of motion vector paths) for the moving object between the first pair of the consecutive digital images $x_1$ and $x_2$ and a second motion vector path (or second set of motion vector paths) for the second pair of consecutive digital images $x_2$ and $x_3$.

As part of determining motion vector paths between consecutive digital images 106, the image transformation system determines the movement and direction of each pixel within a moving object. In particular, the image transformation system identifies a horizontal and vertical motion for each pixel within the moving object. For example, for a pair of consecutive images, the image transformation system identifies a particular pixel in the moving object in the first digital image and a corresponding pixel in the second digital image. Based on the pixel in the moving object in the first digital image and the corresponding pixel in the second digital image, the image transformation system determines the motion of the pixel's direction in a horizontal (i.e., x) and vertical (i.e., y) direction.

The image transformation system uses the movement and direction of each pixel within the moving object to identify a set of pixels along the motion vector path from the pixel to the corresponding pixel. The set of pixels along the motion vector path represent pixel values that pass through a location along the motion vector path as the moving object moves from its location in the first digital image to its location in the second digital image. The image transformation system identifies a set of pixels along a motion vector path for each pixel (e.g., each pixel within a moving object).

As shown in FIG. 1, the image transformation system performs the act 108 of generating blended images. As part of generating the blended images, the image transformation system creates a continuous motion trail by blending pixels along the motion vector path representing motion (of the moving object) between consecutive digital images. In particular, for each pixel in the motion vector path, the image transformation system blends the set of pixels from the first digital image along the motion vector path to generate a blended pixel. The image transformation system generates a blended image by generating a blended pixel for each pixel location. For example, the image transformation system generates a first blended image ($Bx_1x_2$) depicting a continuous motion trail between the moving object in the first digital image ($x_1$) and the second digital image ($x_2$). Additionally, the image transformation system generates a second blended image ($Bx_2x_3$) depicting a continuous motion trail between the moving object in the second digital image ($x_2$) and the third digital image ($x_3$).

As illustrated in FIG. 1, the image transformation system uses the blended images ($Bx_1x_2$ and $Bx_2x_3$) to generate different types of long exposure images. In particular, the image transformation can combine the blended images to generate a virtual long exposure image 110, a virtual rear-sync flash long exposure image 112, and/or a virtual light-painting long exposure image 114. Each of these types of long exposure images will be described in further detail below with respect to FIGS. 3-5. As mentioned above, the image transformation system supports both JPEG and DNG output formats for the virtual long exposure images.

As just mentioned (e.g., in relation to the act 104), in one or more embodiments the image transformation system aligns a plurality of digital images to generate a virtual long exposure digital image. In particular, the image transformation system can select (and applies) an image-alignment model from a feature-based-alignment model or a pixel-adjusted-gyroscope-alignment model.

Figure 2:
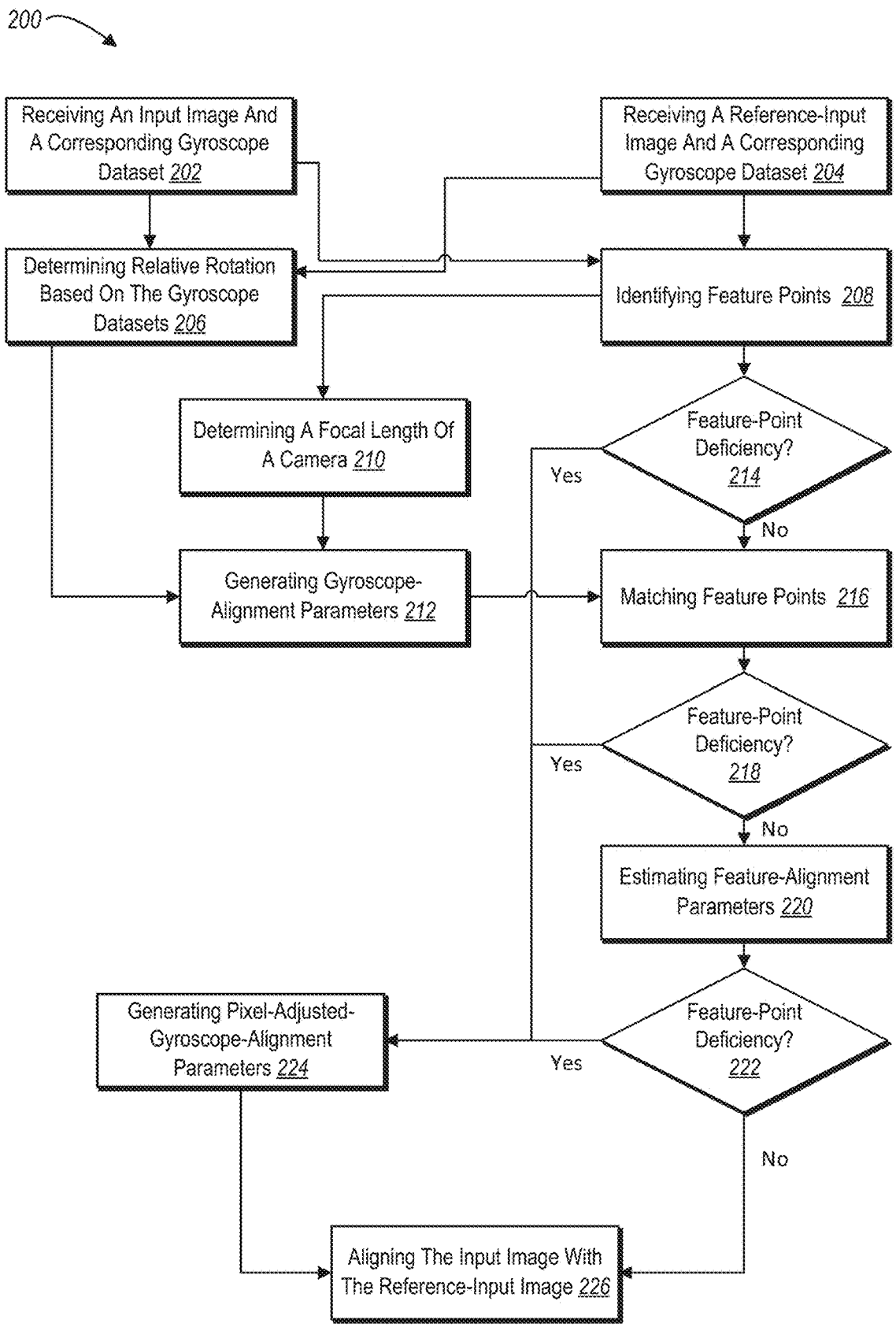
FIG. 2 illustrates a sequence-flow diagram for selecting and applying an image-alignment model from a pixel-adjusted-gyroscope-alignment model and a feature-based-alignment model to align an input image with a reference-input image in accordance with one or more embodiments.

For example, FIG. 2 illustrates the image transformation system selecting between image-alignment models. In particular, FIG. 2 depicts a sequence-flow diagram 200 of acts 202-226 by which the image transformation system selects and applies an image-alignment model from a pixel-adjusted-gyroscope-alignment model and a feature-based-alignment model to align an input image with a reference-input image in accordance with one or more embodiments. As indicated by the sequence-flow diagram 200, upon detecting a feature-point deficiency corresponding to a feature-based-alignment model, the image transformation system applies a pixel-adjusted-gyroscope-alignment model to align an input image with a reference-input image. Upon determining an absence of a feature-point deficiency, by contrast, the image transformation system applies a pixel-based-alignment model to align an input image with a reference-input image.

As shown in FIG. 2, the image transformation system performs the act 202 of receiving an input image and a corresponding gyroscope dataset and the act 204 of receiving a reference-input image and a corresponding gyroscope dataset. When receiving such an input image and reference-input image, in certain embodiments, the image transformation system receives an input image and a reference-image captured by a camera of a computing device (e.g., mobile device). In some cases, the computing device records or registers a gyroscope dataset (e.g., an indication of orientation or attitude of a camera based on angular momentum around each axis) at the time a camera captures the input image and an additional gyroscope dataset at the time the camera capture the reference-input image.

As further shown in FIG. 2, the image transformation system performs an act 206 of determining relative rotation based on the gyroscope datasets. For instance, in some cases, the image transformation system determines a relative rotation between the input image and the reference-input image based on (i) the gyroscope dataset corresponding to the input image and (ii) the gyroscope dataset corresponding to the reference-input image. In some such embodiments, the image transformation system can determine a relative rotation from the reference-input image to the input image by comparing (and determining a difference between) the gyroscope dataset corresponding to the input image and the gyroscope dataset corresponding to the reference-input image.

In addition to determining relative rotation, the image transformation system further performs the act 208 of identifying feature points within the input image and the reference-input image. In some embodiments, for instance, the image transformation system utilizes a SIFT or SURF algorithm to detect a set of feature points within the input image and a set of feature points within the reference-input image. Upon detection, the image transformation system can extract the respective sets of feature points within the input image and the reference-input image.

As indicated by the remaining acts 210-226, the image transformation system uses the identified feature points and corresponding gyroscope datasets to either generate and apply pixel-adjusted-gyroscope-alignment parameters or to generate and apply feature-alignment parameters. As shown in FIG. 2, the image transformation system performs the acts 214, 218, and 222 to determine (at various decision points) whether feature points or feature-alignment parameters corresponding to the input image and reference-input image demonstrate a feature-point deficiency. If the feature points or feature-alignment parameters indicate a feature-point deficiency, the image transformation system generates and applies pixel-adjusted-gyroscope-alignment parameters (as part of a pixel-adjusted-gyroscope-alignment model). If the feature points or feature-alignment parameters indicate an absence of a feature-point deficiency, the image transformation system continues acts that lead toward generating and applying feature-alignment parameters (as part of a feature-based-alignment model).

As shown in FIG. 2, for instance, the image transformation system performs the act 210 of determining a focal length of a camera. For instance, in some embodiments, the image transformation system estimates a focal length of a camera that captures the input image and/or the reference-input image. When determining the focal length of a camera that captures a set of input images, the image transformation system can update an estimate of the focal length based on additional input images captured by the camera. Alternatively, in certain implementations, the image transformation system queries a computing device that captures the input image for a focal length.

In addition to determining a focal length, the image transformation system further performs the act 212 of generating gyroscope-alignment parameters. As indicated by FIG. 2, in some embodiments, the image transformation system generates gyroscope-alignment parameters based on gyroscope datasets respectively corresponding to the input image and the reference-input image and a focal length of a camera. In some such embodiments, the image transformation system generates gyroscope-alignment parameters based on the relative rotation between the input image and the reference-input image determined by act 206.

As further shown in FIG. 2, the image transformation system performs the act 214 of determining whether feature points within one or both of the input image and the reference-input image include a feature-point deficiency. For instance, in certain embodiments, the image transformation system determines whether a set of feature points within the input image and/or a set of feature points within the reference-input image satisfy a threshold amount of feature points. As indicated in FIG. 2, if the feature points within one or both of the input image and the reference-input image do not satisfy the threshold amount of feature points—and indicate a feature-point deficiency at the decision point—the image transformation system forgoes applying a feature-based-alignment model and generates pixel-adjusted-gyroscope-alignment parameters in the act 224. If, however, the feature points within both of the input image and the reference-input image satisfy the threshold amount of feature points—and indicate an absence of a feature-point deficiency at the decision point—the image transformation system continues with acts for the feature-based-alignment model.

As indicated by FIG. 2, upon determining an absence of a feature-point deficiency in act 214, the image transformation system performs the act 216 of matching feature points between the input image and the reference-input image. For example, in certain implementations, the image transformation system matches feature points from a feature-point set within the input image to features points from a feature-point set within the reference-input image. In some such embodiments, the image transformation system matches feature points between the input image and the reference-input image according to a Brute-Force Matcher algorithm, a Fast Library for Approximate Nearest Neighbors ("FLANN") algorithm, or any other suitable feature-point-matching algorithm.

After matching feature points, in some cases, the image transformation system further removes (or filters out) a subset of the matching feature points that conflict with the gyroscope-alignment parameters from act 206. By removing such conflicting matched feature points, the image transformation system creates a filtered set of matching feature points between the input image and the reference-input image.

As further shown in FIG. 2, the sequence-flow diagram 200 includes another decision point, that is the act 218. In some embodiments, the image transformation system performs the act 218 of determining whether matching feature points between the input image and the reference-input image include a feature-point deficiency. For instance, in certain implementations, the image transformation system determines whether matching feature points between the input image and the reference-input image satisfy a threshold amount of matching feature points. As indicated in FIG. 2, if the matching feature points do not satisfy the threshold amount of feature points—and indicate a feature-point deficiency at the decision point—the image transformation system forgoes applying a feature-based-alignment model and generates pixel-adjusted-gyroscope-alignment parameters in the act 224. If, however, the matching feature points satisfy the threshold amount of matching feature points— and indicate an absence of a feature-point deficiency at the decision point—the image transformation system continues with acts for the feature-based-alignment model.

Upon determining an absence of a feature-point deficiency in act 218, the image transformation system performs the act 220 of estimating feature-alignment parameters. For example, in some embodiments, the image transformation system uses the matching feature points between the input image and the reference-input image to estimate feature-alignment parameters. As indicated above, the image transformation system can apply a RANSAC algorithm, LMedS regression algorithm, or other suitable feature-based-image-alignment algorithm to generate the feature-alignment parameters.

Upon determining an absence of a feature-point deficiency in act 218, the image transformation system performs the act 220 of estimating feature-alignment parameters. For example, in some embodiments, the image transformation system uses the matching feature points between the input image and the reference-input image to estimate feature-alignment parameters. As indicated above, the image transformation system can apply a RANSAC algorithm, LMedS regression algorithm, or other suitable robust-model algorithm to generate the feature-alignment parameters.

As further shown in FIG. 2, the sequence-flow diagram 200 includes a final decision point, that is the act 222. In some embodiments, the image transformation system performs the act 222 of determining whether feature-alignment parameters include a feature-point deficiency. For instance, in certain implementations, the image transformation system determines whether the feature-alignment parameters would reasonably align the input image with the reference-input image based on (or with reference to) gyroscope datasets captured by a computing device or gyroscope-alignment parameters. For instance, the image transformation system can determine a differential between feature-alignment parameters corresponding to a feature-based-alignment model and a range of expected feature-alignment parameters for an input image determined from a relative rotation (e.g., a range comprising maximum and minimum expected feature-alignment parameters for an input image based on gyroscope datasets or gyroscope-alignment parameters).

Consistent with the decision points above, if the feature-alignment parameters would not reasonably align the input image with the reference-input image—and indicate a feature-point deficiency—the image transformation system forgoes applying a feature-based-alignment model and generates pixel-adjusted-gyroscope-alignment parameters in the act 224. If, however, the feature-alignment parameters would reasonably align the input image with the reference-input image—and indicate an absence of a feature-point deficiency at the decision point—the image transformation system continues to the act 226 of aligning the input image with the reference-input image (based on the feature-alignment parameters estimated in the act 220).

As just indicated, if the image transformation system detects a feature-point deficiency while performing any of the acts 214, 218, or 222, the image transformation system selects a pixel-adjusted-gyroscope-alignment model instead of a feature-based-alignment model for aligning the input image with the reference-input image. In particular, upon detecting a feature-point deficiency in the acts 214, 218, or 222, the image transformation system forgoes applying a feature-based-alignment model and performs the act 224 of generating pixel-adjusted-gyroscope-alignment parameters.

As a precursor to generating pixel-adjusted-gyroscope-alignment parameters, in some embodiments, the image transformation system warps the input image according to the gyroscope-alignment parameters generated in the act 212 and estimates pixel-based-alignment parameters that would align the warped image with the reference-input image. Based on both the pixel-based-alignment parameters and the gyroscope-alignment parameters, in some embodiments, the image transformation system generates the pixel-adjusted-gyroscope-alignment parameters.

For example, in certain implementations, the image transformation system generates a down-sampled warped image based on gyroscope parameters. The image transformation system down-samples a reference-input image and applies error metrics (e.g., sum of squared differences or sum of absolute differences, root mean squared intensity pixel error, normalized cross-correlation), hierarchical motion estimation, or Fourier-based alignment to the down-sampled reference-input image and the down-sampled warped input image. Based on such error metrics, hierarchical motion estimation, or Fourier-based alignment, the dynamic-image-alignment system estimates alignment parameters that would translate pixels from the down-sampled warped input image to the reference-input image.

As further shown in FIG. 2, the image transformation system performs the act 226 of aligning the input image with the reference-input image. As suggested above, if the feature points or feature-alignment parameters indicate a feature-point deficiency, the image transformation system generates and applies the pixel-adjusted-gyroscope-alignment parameters to the input image to align the input with the reference-input image. If the feature points and the feature-alignment parameters indicate an absence of a feature-point deficiency, the image transformation system generates and applies feature-alignment parameters to the input image to align the input with the reference-input image.

As described above, FIG. 2 demonstrates a flexible and selective image-alignment algorithm. In contrast to some conventional image-alignment systems, the disclosed image transformation system in FIG. 2 uses a flexible approach that selects between a pixel-adjusted-gyroscope-alignment model and a feature-based-alignment model to align digital images. Alternatively, in some embodiments, the image transformation system employs a different selective image-alignment algorithm—by using a feature-point-deficiency metric to select between a pixel-based-alignment model and a feature-based-alignment model to align digital images. Accordingly, based on identifying a feature-point deficiency, in some cases, the image transformation system optionally applies a pixel-based-alignment model (instead of a feature-based-alignment model) to align an input image with a reference-input image. In such embodiments, the image transformation system applies the pixel-based-alignment model by comparing pixels across an input image and a reference-input image and determining pixel-based-alignment parameters for aligning the input image with the reference-input image based on overlapping pixels between the images. Additional detail regarding aligning digital images is described in Aligning Digital Images By Selectively Applying Pixel-Adjusted-Gyroscope Alignment And Feature-Based Alignment Models, application Ser. No. 16/133,380, which is incorporated by reference herein in its entirety.

Figure 3A:
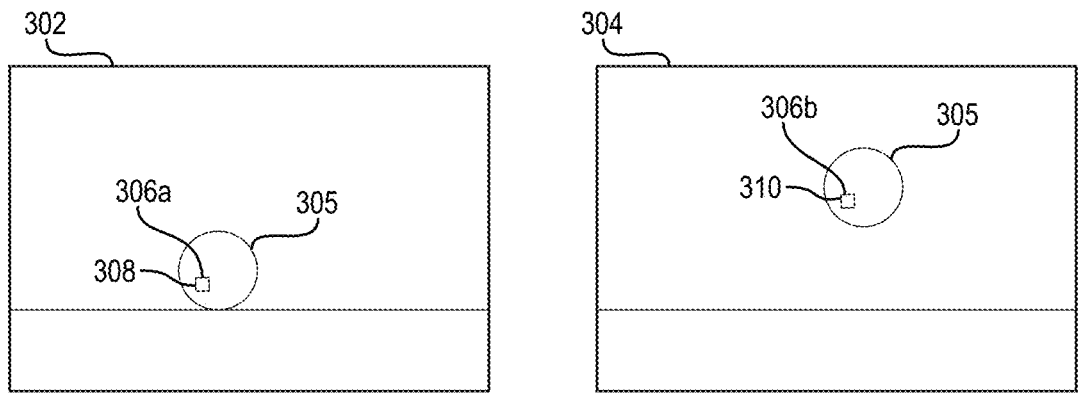
FIGS. 3A-3F illustrate an example blended image generated using a sequential pair of example short exposure digital images in accordance with one or more embodiments.
Figure 3B:
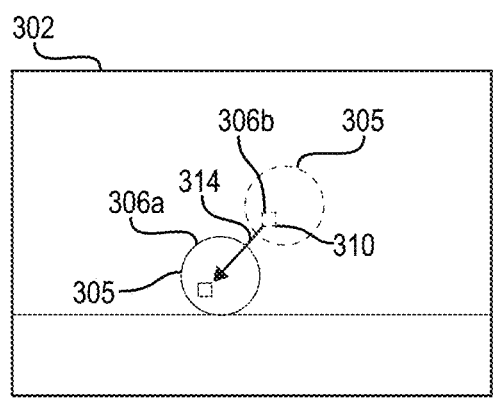
Figure 3C:
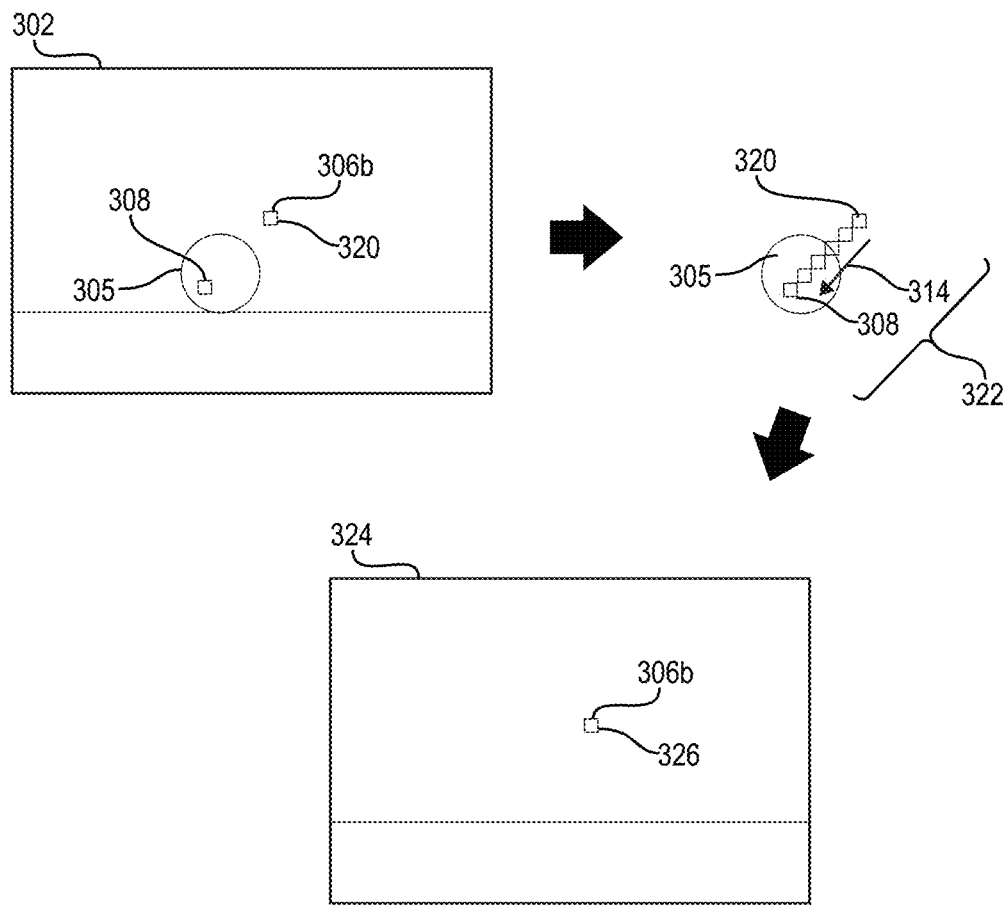
Figure 3D:
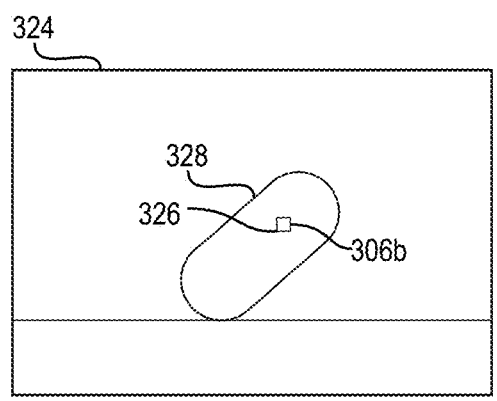
Figure 3E:
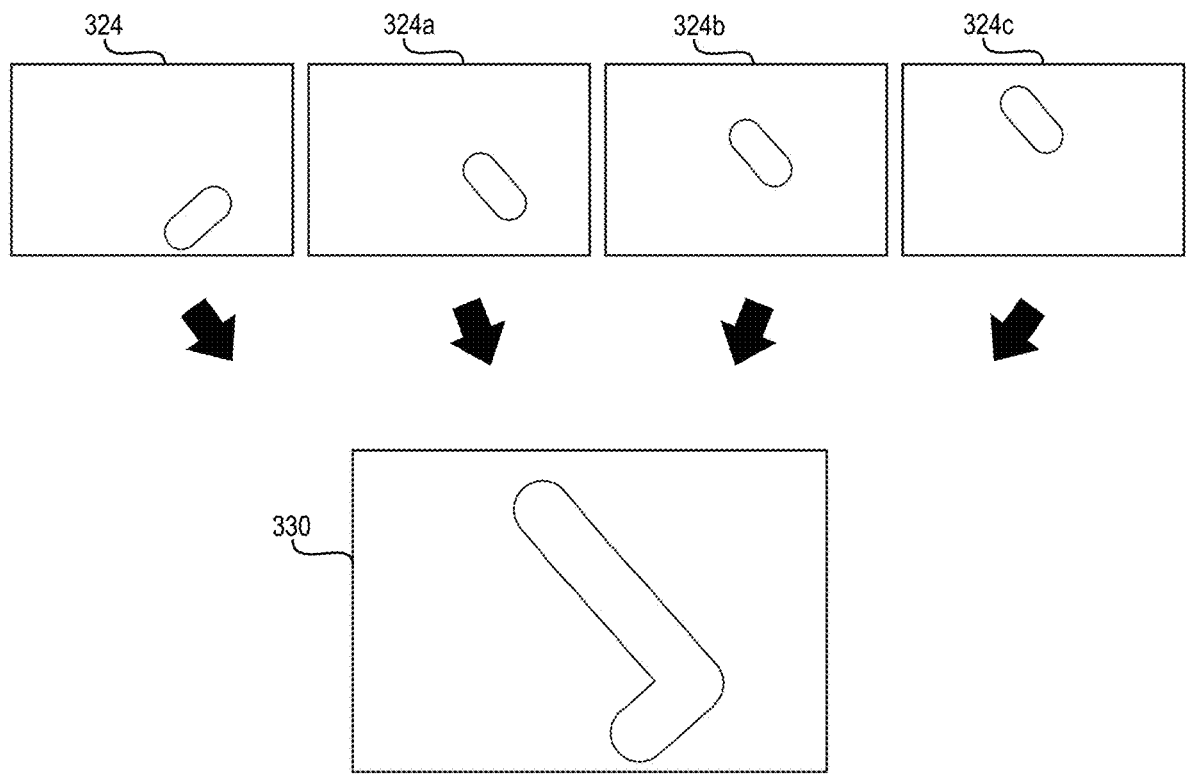
Figure 3F:
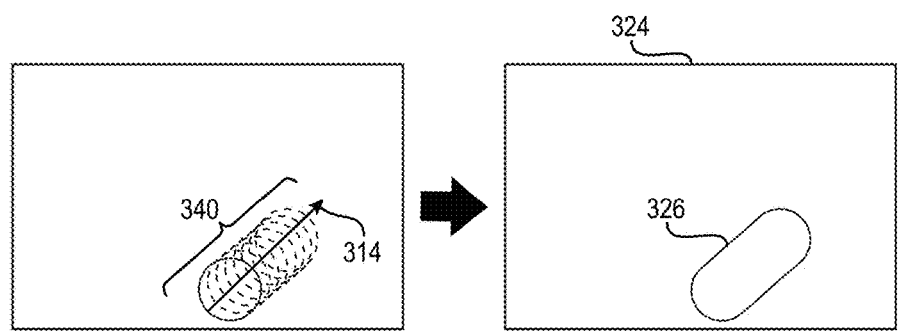

As discussed above, upon aligning digital images, the image transformation system can generate a blended image. For example, FIGS. 3A-3F illustrate generating a blended image using a consecutive pair of short exposure digital images in accordance with one or more embodiments. In particular, FIG. 3A illustrates an example first digital image and an example second digital image. FIG. 3B illustrates determining a motion vector path for pixels between the first digital image and the second digital image (e.g., determining a motion vector path for a moving object). FIG. 3C shows the image transformation system identifying a set of pixels along the motion vector path from a first pixel in the first digital image to generate a blended pixel. Moreover, FIG. 3D illustrates an example blended image based on the first digital image and the second digital image and FIG. 3E illustrates combining a plurality of blended images to generate a virtual long exposure digital image. Furthermore, FIG. 3F illustrates an approach to generating blended images that utilizes intermediate images/pixels between a first digital image and a second digital image.

As just mentioned, FIG. 3A illustrates a first digital image 302 and a second digital image 304. As illustrated, the first digital image 302 and the second digital image 304 are consecutive digital images in a sequence of images portraying a moving object 305. In particular, the first digital image 302 portrays the moving object 305 in a first position 306a and the second digital image portrays the moving object 305 in a second position 306b. The moving object 305 in the first position 306a includes a first pixel 308, and the moving object 305 in the second position 306b includes a corresponding pixel 310.

As illustrated in FIG. 3A, the first digital image 302 and the second digital image 304 are both short exposure input images that belong in a sequence of images. The first digital image 302 and the second digital image 304 can be frames from a video or individual images taken using a camera burst mode. Furthermore, the first digital image 302 and the second digital image 304 illustrated in FIG. 3A can represent any two consecutive pairs of digital images in a sequence of digital images.

FIG. 3B illustrates the first digital image 302 with the second position 306b of the moving object 305 from the second digital image 304 superimposed over the first digital image 302 (for ease in showing the relative position of moving object 305 between digital images within a common reference alignment). As shown in FIG. 3B, the image transformation system determines a motion vector path 314 from the first pixel 308 of the first digital image 302 to the corresponding pixel 310 of the second digital image 304. As part of determining the motion vector path 314 for the moving object 306, the image transformation system determines a horizontal motion and vertical motion of the first pixel 308. The image transformation system utilizes optical flow detection technology in order to identify the horizontal motion and the vertical component from the first pixel 308 to the corresponding pixel 310. For example, in one embodiment, the image transformation system uses an optical flow technique to identify the horizontal and vertical components of the motion vector path 314. Equation 1 represents an optical flow technique by which the image transformation system determines the motion vector path 314 comprising motion in the horizontal direction ($F_{i,x}$) and the vertical direction ($F_{i,y}$).

$$I_i^{(a)}(x,y)=I_{i+1}^{(a)}(x+F_{i,x}(x,y),y+F_{i,y}(x,y)) \quad (1)$$

In at least one embodiment, the image transformation system uses any one of a variety of flow detection techniques to determine the motion vector path 314. Additionally, the image transformation system is not limited to applying flow detection to full resolution digital images. The image transformation system can down-sample a digital image and apply the flow detection to the down-sampled digital image, thus efficiently utilizing computing resources when determining the motion vector path.

In Equation 1, represents the first digital image 302, and $I_{i+1}$ represents the second digital image 304. More particularly, $I_i^{(a)}(x,y)$ represents the location of the first pixel 308 (or group of pixels) in the first digital image 302 and $I_{i+1}^{(a)}(x,y)$ represents the location of the corresponding pixel 310 (or group of pixels) in the second digital image 304. In this manner, the image transformation can determine the motion vector path 314. Moreover, by determining the horizontal motion $F_{i,x}$ and the vertical motion $F_{i,y}$ of each pixel (or group of pixels) in the moving object, the image transformation system can determine one or more motion vector paths for pixels of the moving object 305.

As mentioned, the image transformation system can utilize a variety of optical flow techniques to determine a motion vector path (e.g., a motion field) for moving objects between digital images. For example, the image transformation system can utilize the optical flow techniques described by J. L. Barron, D. J. Fleet, S. S. Beauchemin, and T. A. Burkitt in *Performance of Optical Flow Techniques*, International Journal of Computer Vision, Vol. 12, Issue 1, 45-77 (1994).

By determining motion vector paths, the image transformation system can determine sets of pixels along a motion vector path for each pixel in the moving object 306. For example, FIG. 3C illustrates determining a set of pixels along a motion vector path in accordance with one or more embodiments. In particular, FIG. 3C illustrates a second pixel 320 in the first digital image 302 (at the second location 306b). As shown, the image transformation system utilizes the vector motion path 314 to determine a set of pixels 322 along the motion vector path 314 from the first pixel 308 to the second pixel 320. Notably, in the embodiment of FIGS. 3A-3D, the second pixel 320 is in the same position within the first digital image 302 as the corresponding pixel 310 illustrated in FIG. 3B.

As shown in FIG. 3C, the image transformation system utilizes the set of pixels 322 to generate a blended pixel 326 corresponding to the second pixel 320. Specifically, the image transformation system can generate the blended pixel 326 for a blended image 324 by blending (e.g., combining or averaging) the pixel values from the set of pixels 322. Notably, the blended pixel 326 is in the same relative position within the blended image 324 as the second pixel 320 within the first digital image 302 (i.e., in the second position 306b).

Though FIG. 3C illustrates generating the blended pixel 326 from the specific set of pixels 322 along the motion vector path 314 between the first pixel 308 and the second pixel 320, the image transformation system can generate blended pixels from motion vector paths for each of the pixels in the first digital image (e.g., each of the pixels that the moving object moves through). Accordingly, the image transformation system can determine a motion vector path and a set of pixels for each pixel located within a moving object boundary defined by motion of the moving object 305 between the first digital image 302 and the second digital image 304. Moreover, for each pixel (e.g., each pixel within a motion boundary), the image transformation system can combine a set of pixels along a corresponding motion vector path to generate blended pixels for a blended image.

For example, FIG. 3D illustrates the blended image 324 with blended pixels corresponding to each pixel within the first digital image 302 (e.g., blended pixels for each pixel within a motion boundary). Specifically, FIG. 3D illustrates the blended image 324 including the blended moving object 328 representing the movement of the moving object 305 between the first digital image 302 and the second digital image 304. As just described, the image transformation system generates the blended image 324 by aggregating the set of pixels along a motion vector path for each pixel within the first digital image 302.

The blended image 324 of FIG. 3D is for illustrative purposes and does not necessarily reflect an actual blended image. In particular, actual blended pixels of the blended moving object 328 vary by intensity depending on the intensity of the corresponding sets of pixels. Thus, in at least one embodiment, the shape of the blended moving object 328 will be irregular and include pixels of varying intensity.

In at least one embodiment, the image transformation system generates blended pixels based on aggregated pixel values solely from the moving object 305. In particular, the image transformation system distinguishes between background and the moving object 305. The image transformation system aggregates sets of pixel values associated with the moving object 305 and generates blended pixels along the motion vector path 314 based on those values (without blending background pixels not associated with the moving object 305). In other embodiments, the image transformation system generates blended pixel values for all pixels in a digital image.

As mentioned above, the image transformation system can also generate a virtual long exposure image by combining blended images. Indeed, although FIGS. 3A-3D illustrate generation of the blended image 324 based on the first digital image 302 and the second digital image 304, the image transformation system can generate a blended image for each consecutive pair of digital images in a sequence of images. Moreover, the image transformation system can combine the blended images to generate a virtual long exposure image.

For example, FIG. 3E illustrates generating a virtual long exposure image by combining blended images. Specifically, FIG. 3E illustrates the image transformation system generating a plurality of blended images 324-324n from consecutive digital images in a sequence of digital images. As shown, each blended image illustrates motion of a moving object between digital images in the sequence of digital images. Moreover, FIG. 3E illustrates the image transformation system combining the plurality of blended images 324-324n to generate a virtual long exposure digital image 330. Specifically, the image transition system can combine (e.g., average) the pixel values of the blended images 324-324n to generate the pixel values for the virtual long exposure digital image 330.

For example, Equation 2 below provides an example function for generating a virtual long exposure image L.

$$L = \frac{1}{N-1}\sum_{i=1}^{N-1} B_i \qquad (2)$$

In equation 2, N represents the number of digital images in the sequence of digital images. $B_i$ represents an image in the set of blended images $B=\{B_i; i \in \{1, \ldots, N-1\}\}$.

Although FIGS. 3A-3E illustrate a specific approach to generating a virtual long exposure image, it will be appreciated that the image transformation system can utilize alternative approaches. For example, although FIG. 3C shows a particular illustration for averaging a set of pixels identified by a motion vector path to generate a blended image, the image transformation system can generate a blended image utilizing a variety of approaches. For example, the image transformation system can generate blended pixels by simulating the motion of the moving object from the moving object in the first position 306a to the moving object in the second position 306b by generating and blending intermediate images.

For example, FIG. 3F illustrates generating intermediate images based on a vector motion path. As shown, the image transformation system generates intermediate images 340 of the moving object 305 from the first digital image 302 along the vector motion path 314 between the first position 306a and the second position 306b. Specifically, the image transformation system generates intermediate samples of each pixel of the moving object in the first position 306a to the second position 306b along the vector motion path 314.

Moreover, as shown in FIG. 3F, the image transformation system combines the intermediate images 340 to generate a blended image 324 including a blended moving object 326. Notably, by combining each of the intermediate images 340, the image transformation system, for each pixel, combines a set of pixels along the vector motion path 314. Thus, the embodiment illustrated in FIG. 3F is a specific approach to the embodiment described in FIG. 3C.

In at least one embodiment, the image transformation system varies the number of intermediate pixel samples utilized to generate the blended image 324. For example, for longer motion vector paths 314 representative of a faster-moving object, the image transformation system can increase (or decrease) the number of intermediate pixel samples. Likewise, for shorter motion vector paths 314, the image transformation system can limit (or increase) the number of intermediate pixel samples. In at least one embodiment, the number of intermediate pixel samples is fixed.

In at least one embodiment, the image transformation system adjusts exposure settings by identifying particular ranges for the set of blended images to combine to generate a virtual long exposure image. For example, to simulate shorter exposure times, the image transformation system reduces the number of blended images used to generate the virtual long exposure images. The image transformation system can automatically identify the blended images to use in generating a virtual long exposure image. In at least one embodiment, the image transformation system receives user input indicating the range of blended images to include in the virtual long exposure image.

Figure 4:
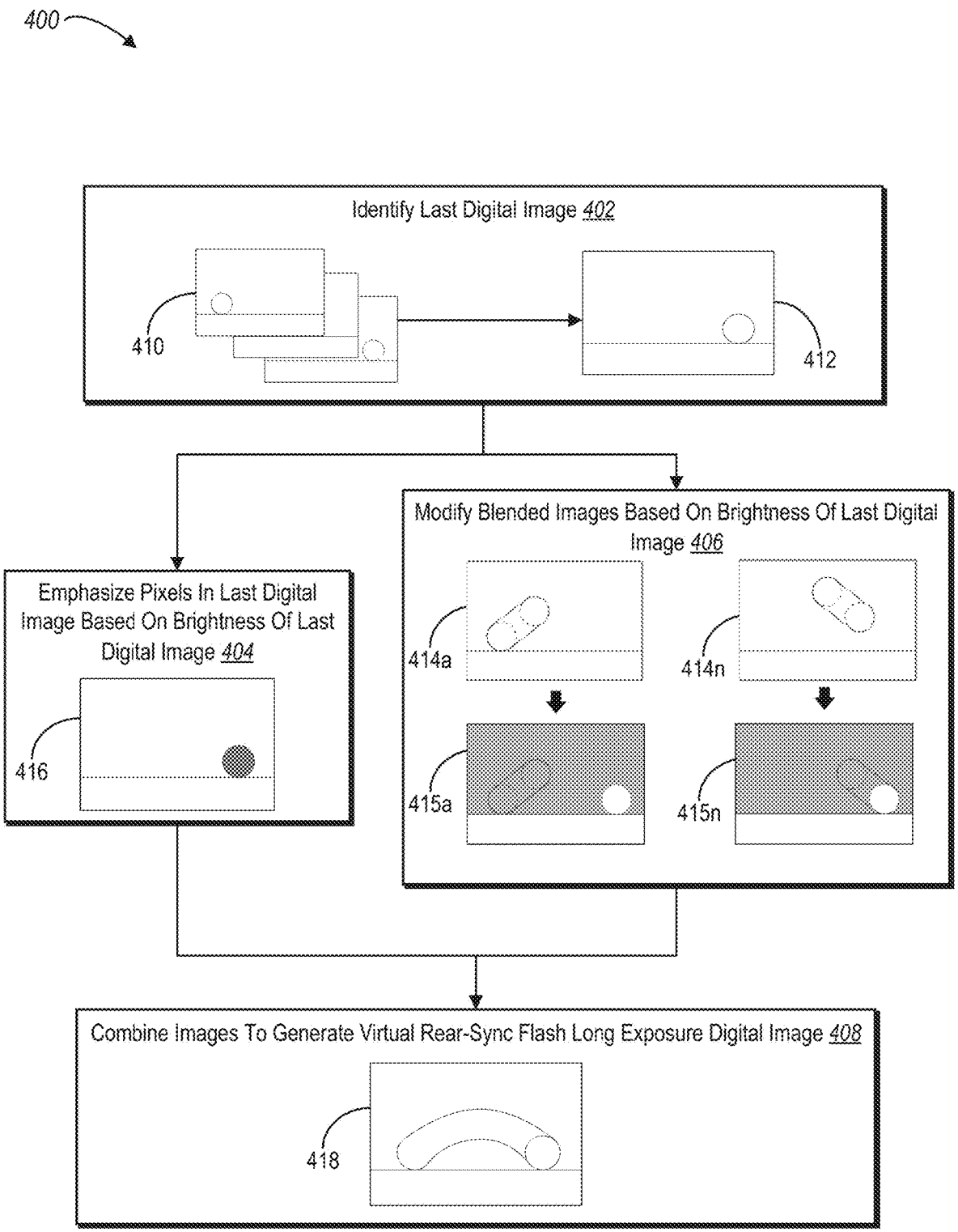
FIG. 4 illustrates a sequence-flow diagram for generating a rear-sync flash digital image using a series of digital images in accordance with one or more embodiments.
Figure 5:
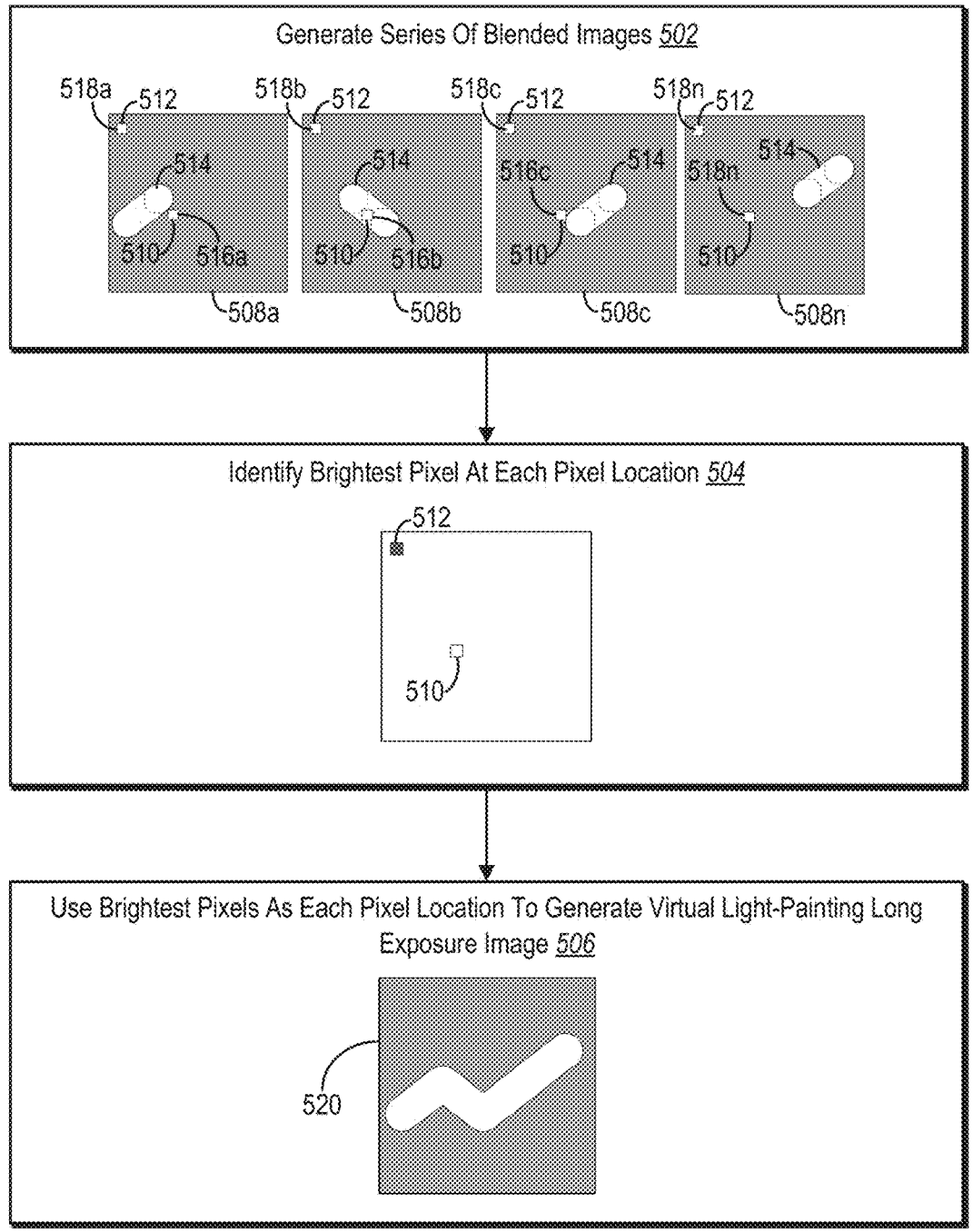
FIG. 5 illustrates a sequence-flow diagram for generating a virtual light-painting image from a series of blended images in accordance with one or more embodiments.

As mentioned previously, the image transformation system can generate various types of virtual long exposure images. In addition to generating regular virtual long exposure images as described above, the image transformation system can generate rear-sync flash long exposure digital images, and virtual light-painting long exposure digital images. FIG. 4 illustrates the image transformation system generating a rear-sync flash long exposure digital image. FIG. 5 illustrates the image transformation system generating a virtual light-painting long exposure digital image.

Specifically, FIG. 4 illustrates a sequence-flow diagram of a series of acts 400 performed by the image transformation system to generate a virtual rear-sync flash long exposure digital image. As shown in FIG. 4, the series of acts 400 includes an act 402 of identifying a last digital image in a sequence of digital images. In other words, the image transformation system selects a last digital image 412 from a sequence of digital image 410 corresponding with the desired moment of a virtual flash (e.g., a frame to be emphasized in the resulting long exposure digital image). As illustrated in FIG. 4, the image transformation system identifies the last digital image 412 as a virtual flash frame.

Although in FIG. 4, the image transformation system identifies the last digital image 412 as the virtual flash frame, the image transformation system can identify other images, beside the last digital image, from the series of images as the virtual flash frame. For example, the image transformation system can select an image from the middle of the sequence of images to clarify the main subject in the middle of a motion trail. Alternatively, the image transformation system can identify the first image in a series of images as the virtual flash frame. In at least one embodiment, the image transformation system identifies the virtual flash frame based on user input.

As illustrated in FIG. 4, the image transformation system also performs an act 404 of emphasizing pixels in the last digital image 412 based on the brightness of the last digital image 412. In particular, the image transformation system weights the contribution of each pixel from the last digital image with the brightness of the pixel to generate a modified flash frame 416 using a shock frame. In particular, the image transformation system weights pixels in the modified flash frame 416 according to the brightness of each pixel in the image.

For example, the image transformation system generates the modified flash frame 416 from the final digital image 412 in the sequence of digital images 410 by multiplying each pixel by a brightness value of corresponding pixels in the final digital image 412. Thus, brighter objects/pixels from the last digital image 412 are emphasized in the modified flash frame 416 because they are weighted by brightness based on a shock frame. For example, in some embodiments, the image transformation system applies a shock frame comprising a grayscale version of the final digital image 412 normalized to the range of [0,1] to the final digital image 412 to generate the modified flash frame 416. For example, as illustrated in the act 406 of FIG. 4, the image transformation system emphasizes the ball (i.e., the brightest pixels) in the last digital image to generate the modified flash frame 416.

As illustrated in FIG. 4, the series of acts 400 includes an act 404 of modifying blended images based on the brightness of the last digital image. In particular, the image transformation system generates modified blended images 415a-415n from a set of blended images 414a-414n based on the brightness of the last digital image 412.

As discussed previously (e.g., in relation to FIGS. 3A-3F), the image transformation system can generate blended images that reflect movement between consecutive digital images in a digital image sequence. In relation to FIG. 4, the image transformation system generates the set of blended images 414a-414n in this manner. The image transformation system then modifies the plurality of blended images 414a-414n based on the brightness of the last digital image 412.

In particular, the image transformation system modifies the set of blended images 414a-414n by emphasizing pixels based on the inverse of the shock image or the brightness of the last digital image 412. For example, as illustrated in the act 404 of FIG. 4, the image transformation system emphasizes pixels located around, but not including, the brightest pixels in the last digital image 412. In other words, the image transformation system de-emphasis pixels in the set of blended images 414a-414n that are in the same position of bright pixels in the last digital image 412. To illustrate, the image transformation system can generate modified blended images by applying the inverse of a grayscale version of the final digital image 412 normalized to the range of [0,1] to the set of blended images 414a-414n.

As shown in FIG. 4, the series of acts 400 also includes an act 408 of combining the modified last digital image 416 with the modified blended images 415a-415n to generate a virtual rear-sync flash digital image 418. The virtual rear-sync flash digital image includes a motion trail as well as a clear main subject. By modifying the blended images and emphasizing pixels in the last digital image based on the brightness of pixels in the last digital image, the image transformation system helps overcome shortcomings of conventional systems. For instance, the image transformation system can generate a virtual rear-sync flash digital image using short exposure images captured in daylight conditions and for moving objects far away from the camera.

Equation 3 below provides an example function for generating a rear-sync flash digital image LR.

$$LR = \frac{1}{N-1}(1 - \overline{I_N}) \circledast \sum_{i=1}^{N-1} B_i + \overline{I_N} \circledast I_N^{(a)} \qquad (3)$$

In equation 3, N represents number of digital images in the sequence of digital images, and $B_i$ represents an image in the set of blended images $B=\{B_i; i \in \{1, \ldots, N-1\}\}$. $\overline{I_N}$ represents the shock frame reflecting the brightness of the last digital image $I_N^{(a)}$ normalized to the range of [0,1]. $\circledast$ is the pixel-wise multiplication. In at least one embodiment, $\overline{I_N}$ comprises a grayscale version of the last digital image.

As mentioned above, the image transformation system can also generate virtual light-painting long exposure images. FIG. 5 illustrates a sequence-flow diagram of a series of acts 500 performed by the image transformation system to generate a virtual light-painting long exposure image. As shown in FIG. 5, the series of acts 500 includes an act 502 of generating a series of blended images. As discussed above (e.g., in relation to FIGS. 3A-3F) the image transformations system can generate a plurality of blended images from a sequence of digital images. For example, as illustrated in FIG. 5, the image transformation system generates a set of blended images 508a-508n from a sequence of digital images portraying a light source 514 moving. As illustrated in FIG. 5, the set of blended images 508a-508n depicts motion of the light source 514 from the left side of the digital images to the right side of the digital images. For illustrative purposes, two pixel locations, including a central pixel location 510 and a corner pixel location 512, have been highlighted in the set of blended images 508a-508n. Specifically, the set of blended images 508a-508n include central pixels 516a-516n at the central pixel location 510 and corner pixels 518a-518n at the corner pixel location 512.

As shown in FIG. 5, the series of acts 500 includes an act 504 of identifying a brightest pixel at each pixel location. As part of the act 504, the image transformation system extracts a brightness value for each pixel location across the set of blended images 508a-508n. For example, in relation to FIG. 5, the image transformation system compares the central pixels 516a-516n at the central location 510 and determines that the second blended image 508b includes the brightest pixel for the central pixel location 510. Indeed, in the second blended image 508b, the motion trail for the light source 514 passes through the central pixel location 510.

The image transformation system also compares the corner pixels 518a-518n at the corner location 512. However, the light source 514 does not pass through the corner pixel location 512 in any of the blended images 508. Therefore, the brightest pixel for the corner pixel location 512 is darker compared to the brightest pixel for the central pixel location 510. In at least one embodiment, the image transformation system selects the brightest pixel at each pixel location for a series of grayscale blended images.

As illustrated in FIG. 5, the series of acts 500 also includes act 506 of using the brightest pixels at each pixel location to generate a virtual light-painting long exposure image 520. In particular, the image transformation system iterates through each pixel location, identifies the brightest pixel at the pixel location, and adds the brightest pixel to the virtual light-painting long exposure image 520. As shown, in this manner the image transformation system creates a strong light motion trail across each pixel location through which the light source 514 passes. Additionally, because the image transformation system identifies the brightest pixels at each location, the image transformation system can maximize the contrast between bright pixels and dark pixels in virtual light-painting images even when using a sequence of short exposure images with low-intensity light sources relative to the scene.

Equation 4 below provides an example function for generating a virtual light-painting long exposure image at each pixel location L(x,y).

$$L(x,y)=B_i(x,y); i=\mathrm{argmax}_{i=1}^{N-1} \overline{B_i}(x,y) \qquad (4)$$

In equation 4, B, represents an image in the set of blended images B={$B_i$; i∈{1, . . . , N−1}}. argmax is pixel-wise operator selecting the image with the brightest pixel, and $\overline{B_i}$ is a version the blended images that represent the brightness of $B_i$. In at least one embodiment, $\overline{B_i}$ is the grayscale version of $B_i$.

FIGS. 3A-5 illustrate generating different types of virtual long exposure images using a sequence of short exposure images. FIGS. 6A-6D illustrate example images representing the different types of virtual long exposure images. In particular, FIG. 6A illustrates an example short exposure input image. Indeed, FIG. 6A illustrates a digital image of a river with rough water flowing through rocks. Because the digital image of FIG. 6A is a short exposure image, the moving water appears rough and turbulent as it runs through the rocks portrayed in the image.

Figure 6B:
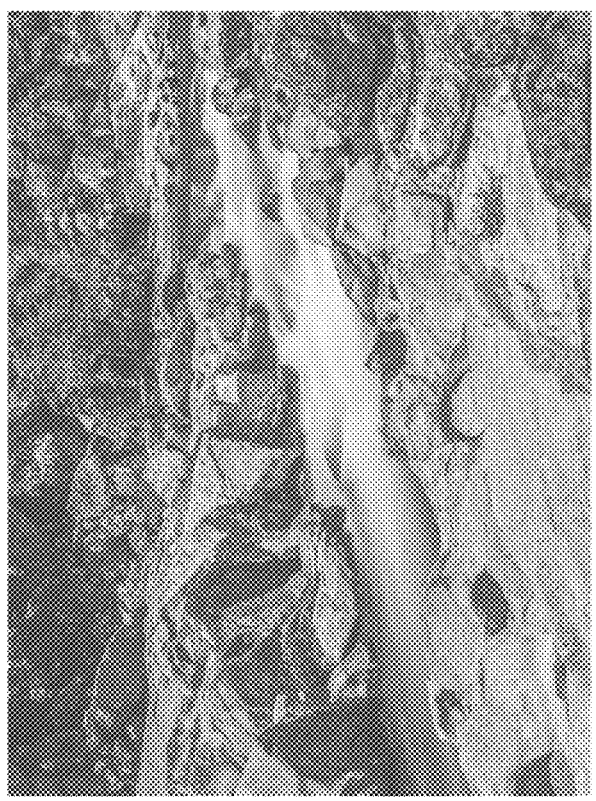
FIGS. 6A-6D illustrate an example short exposure image, an example virtual long exposure image, an example virtual rear-sync flash long exposure image, and an example virtual light-painting long exposure image in accordance with one or more embodiments.
Figure 6A:
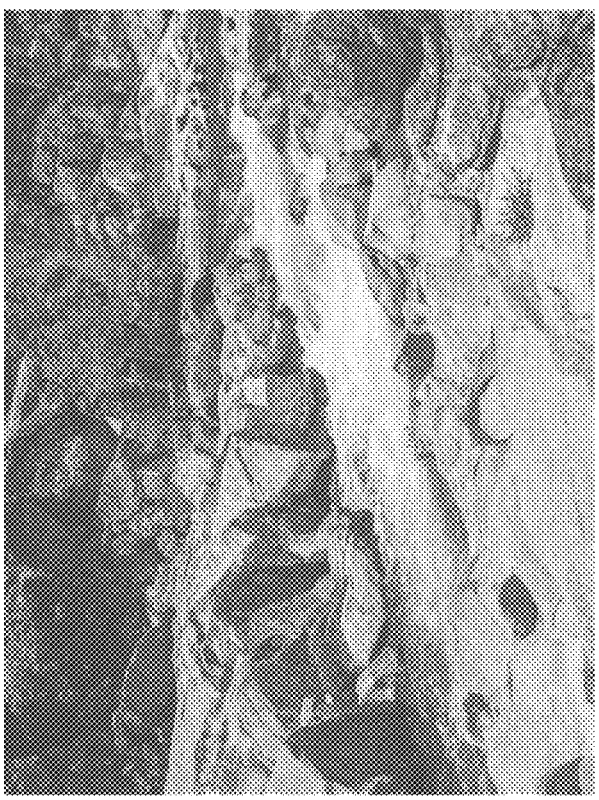

FIG. 6B illustrates an example virtual long exposure image based on the digital image of FIG. 6A. In contrast to the short exposure image of FIG. 6A, the virtual long exposure image of FIG. 6B is smoothed and flowing. Indeed, the image transformation system utilizes motion vector paths to blend pixels across a sequence of digital images to generate a smooth portrayal of water in the river. The image transformation system generates the virtual long exposure image of FIG. 6B without the need for a tripod, camera with a long shutter flash, or other equipment.

Figure 6D:
Figure 6C:

FIG. 6C illustrates an example virtual rear-sync flash long exposure digital image. As illustrated in FIG. 6C, the image transformation system analyzes a sequence of digital images that include a moving car. The image transformation system aligns and blends the sequence of digital images to generate a rear-sync flash long exposure digital image that portrays the car with a clear, smooth trail (without artifacts) along the motion path of the car. Notably, the image transformation system generates the rear-sync flash long exposure digital image of the car, even though the car is a far distance from the camera and a camera flash cannot clearly illuminate the car. As discussed above, conventional long exposure cameras would not produce such a result.

Finally, FIG. 6D illustrates an example virtual light-painting long exposure digital image. In particular, the image transformation system generates the virtual light-painting long exposure digital image from a sequence of digital images portraying a woman moving a light in the shape of a heart. Notably, the background of FIG. 6D is not uniformly dark. Indeed, the background includes a variety of light objects (e.g., windows, hall lights, etc.). Nonetheless, the virtual light-painting long exposure digital image clearly portrays the path of movement of the light. As discussed above, conventional long exposure systems would not produce such a result.

Figure 7:
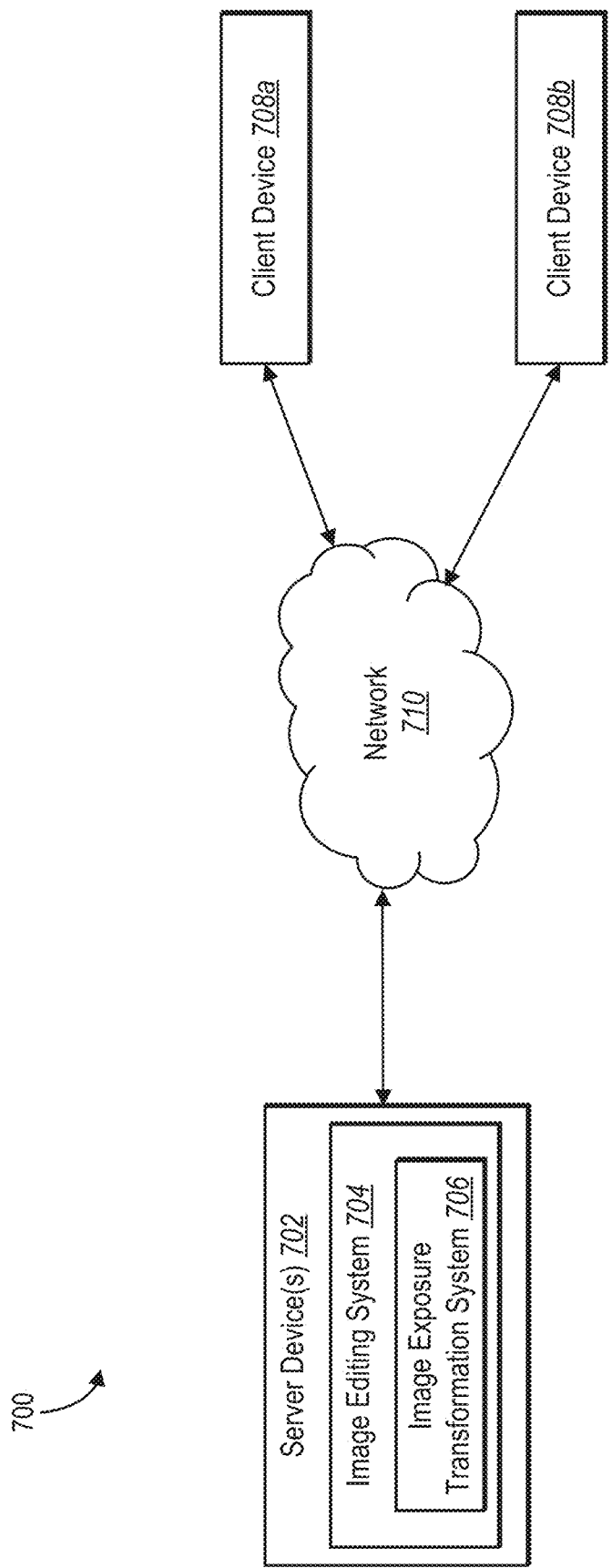
FIG. 7. Illustrates a block diagram of an environment in which an image transformation system can operate in accordance with one or more embodiments.

FIG. 7 illustrates a schematic diagram of an environment 700 in which the image transformation system 706 may be implemented in accordance with one or more embodiments. As shown in FIG. 7, the environment 700 includes various computing devices including server device(s) 702 and one or more client devices 708a, 708b. In addition, the environment 700 includes a network 706. The network 706 may be any suitable network over which the computing devices can communicate. Example networks are discussed in more detail below with regard to FIG. 10.

As shown, the environment 700 includes the client devices 708a, 708b. The client devices 708a, 708b may comprise various types of client devices. For example, in some embodiments, the client devices 708a, 708b include a mobile device, such as a laptop, a tablet, a mobile telephone, a smartphone, etc. In other embodiments, the client devices 708a, 708b include a non-mobile device, such as a desktop or server, or another type of client device. Additional details with regard to the client devices 708a, 708b are discussed below with respect to FIG. 10.

As illustrated in FIG. 7, the environment 700 includes the server device(s) 702. The server device(s) 702 can generate, store, receive, and/or transmit any type of data, including digital images and virtual long exposure digital images. For example, the server device(s) 702 can receive, store, and modify a sequence of digital images from the client device 708a and transmit virtual long exposure digital image to the client device 708a. In one or more embodiments, the server device(s) 702 comprises a data server. The server device(s) 702 can also comprise a communication server or a web-hosting server. Additional detail regarding the server device(s) 702 are provided below in relation to FIG. 10.

As shown, the server device(s) 702 includes the image editing system 704 and the image transformation system 706. The image editing system 704, in general, facilitates the creation, modifying, editing, sharing, and/or management of digital images. For example, the image editing system 704 can store a repository of digital images and (in response to requests from the client devices 708*a*-708*b*) modify the digital images (e.g., perform a variety of photo-editing functions).

As shown, the image editing system 704 can include the image transformation system 706. For example, as described above, the image transformation system 706 can generate a virtual long exposure image from a sequence of short exposure images (e.g., images captured or received form the client device 708*a*). Moreover, the image transformation system 706 (via the image editing system 704) can provide the virtual long exposure image to the client device 708*a*.

As illustrated, in one or more embodiments, the server device(s) 702 can include all, or a portion of, the image transformation system 706. In particular, the image transformation system 706 can comprise an application running on the server device(s) 702 or a portion of a software application that can be downloaded from the server device(s) 702. For example, the image transformation system 706 can include a web hosting application that allows a client device 708*a* to interact with content hosted on the server device(s) 702. To illustrate, in one or more embodiments of the environment 700, the client device 708*a* accesses a web page supported by the server device(s) 702. In particular, the client device 708*a* can run an application to allow a user to access, generate view, select, create, and/or modify virtual long exposure images within a web page or website hosted at the server device(s) 702 (e.g., a web page enables a user to provide a short exposure target image, and receive, from the server, a virtual long exposure image).

Although FIG. 7 illustrates a particular arrangement of the server device(s) 702, the client devices 708*a*, 708*b* and the network 706, various additional arrangements are possible. For example, while FIG. 7 illustrates the one or more client devices 708*a*, 708*b* communicating with the server device(s) 702 via the network 706, in one or more embodiments a single client device may communicate directly with the server device(s) 702, bypassing the network 706.

Similarly, although the environment 700 of FIG. 7 is depicted as having various components, the environment 700 may have additional or alternative components. For example, the image transformation system 706 can be implemented on multiple computing devices. In particular, the image transformation system 706 may be implemented in whole by the server device(s) 702 or the image transformation system 706 may be implemented in whole by the client device 708*a* (e.g., the client device 708*a* can capture digital images, store digital images, and/or generate virtual long exposure digital images utilizing the image transformation system 706). Alternatively, the image transformation system 706 may be implemented across multiple devices or components.

Figure 8:
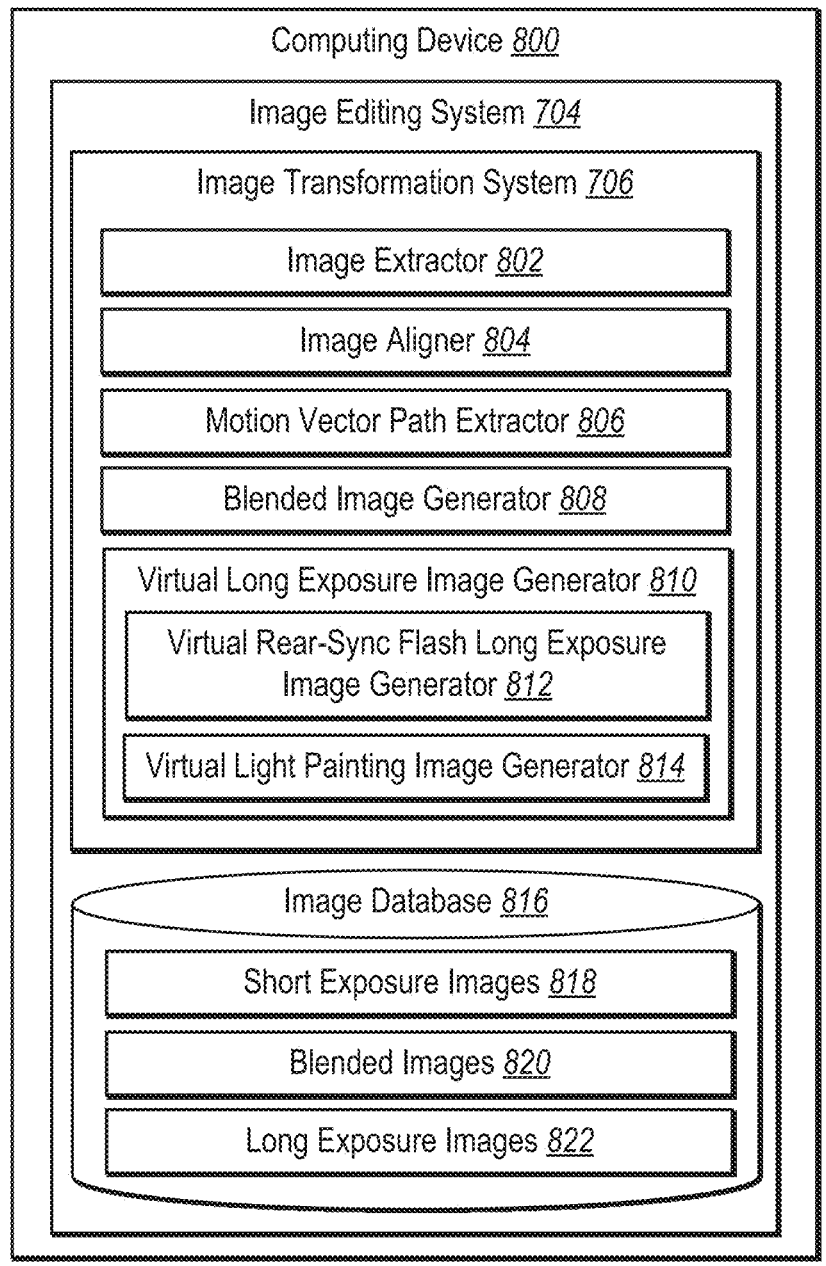
FIG. 8 illustrates a block diagram of an exemplary computing device for implementing one or more embodiments of the present disclosure.

Referring now to FIG. 8, additional detail is provided regarding capabilities and components of the image transformation system 706 in accordance with one or more embodiments. In particular, FIG. 8 shows a schematic diagram of an example architecture of the image transformation system 706 of an image editing system 704 and implemented on a computing device 800 (e.g., the client device(s) 708*a*-708*b* and/or the server device(s) 702). The image transformation system 706 can represent one or more embodiments of the image transformation system described previously.

As illustrated in FIG. 8, the image transformation system 706 includes various components for performing the processes and features described herein. For example, the image transformation system 706 includes an image extractor 802, an image aligner 804, a motion vector path extractor 806, a blended image generator 808, a virtual long exposure image generator 810, a virtual rear-sync flash long exposure image generator 812, a virtual light-painting image generator 814, and an image database 816. Each of these components is described below in turn.

As mentioned above, the image transformation system 706 includes the image extractor 802. In general, the image extractor 802 facilitates identifying, accessing, receiving, obtaining, generating, and importing images. In one or more embodiments, the image extractor 802 operates in connection with the image editing system 704 to access images. In particular, the image extractor 802 can extract short exposure images 818 from video files. Further, as shown, the image extractor 802 can access one or more of the images within the image database 816.

As shown, the image transformation system 706 includes the image aligner 804. The image aligner 804 can generate a relative alignment between multiple digital images (e.g., align the digital images to a common reference). As described above, the image aligner 804 uses feature points and corresponding gyroscope datasets to either generate and apply pixel-adjusted-gyroscope-alignment parameters or to generate and apply feature-alignment parameters to align a series of images. The image aligner 804 selects and applies one of the feature-based-alignment model or a pixel-adjusted-gyroscope-alignment model.

As illustrated in FIG. 8, the image transformation system 706 includes the motion vector path extractor 806. As described above, the motion vector path extractor 806 determines a motion vector path for pixels, feature-points, and/or moving objects between a first digital image and a second digital image from a consecutive pair of digital images. More particularly, the motion vector path extractor 806 determines a horizontal motion and a vertical motion for each pixel in the moving object. Using the motion vector of each pixel within the moving object, the motion vector path extractor 806 determines the motion vector path.

The image transformation system 706 includes the blended image generator 808. As described above, the blended image generator 808 generates blended pixels along the motion vector path by aggregating pixel values from a set of pixels along the motion vector path. The blended image generator 808 generates a blended image for each consecutive pair of digital images in a sequence of digital images. The blended image generator 808 can send blended images to the virtual long exposure image generator 810, the virtual rear-sync flash long exposure image generator 812, and/or the virtual light-painting image generator 814.

The image transformation system 706 includes the virtual long exposure image generator 810. The virtual long exposure image generator 810 can create, generate, produce, and/or provide a virtual long exposure image. As described above, the virtual long exposure image generator 810 combines and averages the set of blended images to generate a regular virtual long exposure image. In particular, the virtual long exposure image portrays a motion trail of a moving object.

The image transformation system 706 includes the virtual rear-sync flash long exposure image generator 812 (i.e., as part of the virtual long-exposure image generator 810). The virtual rear-sync flash long exposure image generator 812 can create, generate, produce, and/or provide a virtual rear-sync flash long exposure image. As described above, the virtual rear-sync flash long exposure image generator 812 extracts the brightness of pixels in the last digital image. The virtual rear-sync flash long exposure image generator 812 modifies the set of blended images and the last digital image based on the extracted brightness of the last digital image and combines the modified images to generate a virtual rear-sync flash long exposure image. More particularly, the virtual rear-sync flash long exposure image generator 812 generates an image including both a motion trail and a clear main subject from the last digital image.

The image transformation system 706 also includes virtual light-painting image generator 814 (e.g., as part of the virtual light-painting image generator 814). The virtual light-painting image generator 814 can create, generate, produce, and/or provide a virtual light-painting long exposure image. As described above, the virtual light-painting image generator 814 identifies the brightest pixel at each pixel location in a series of blended images. The virtual light-painting image generator 814 then generates a virtual light-painting image using the brightest pixels at each location.

As also shown, the image transformation system 706 includes the image database 816. The image database 816 includes the short exposure images 818. The short exposure images 818 can include a sequence of short exposure images portraying a moving object. The short exposure images 818 can be captured using burst mode. Additionally, short exposure images can be extracted from video footage.

The image database 816 also includes blended images 820. The blended images 820 include blended images generated by the blended image generator 808. More particularly, the blended images 820 include images portraying motion of moving objects between consecutive pairs of digital images in a sequence of digital images.

In addition, as shown, the image database 816 includes long exposure images 822. The long exposure images 822 can include long exposure images generated by the image transformation system 904. In particular, long exposure images 822 can include images generated by the virtual long exposure image generator 810, the virtual rear-sync flash long exposure image generator 812, and/or the virtual light paining image generator 814.

Each of the components 802-822 of the image transformation system 706 can include software, hardware, or both. For example, the components 802-822 can include one or more instructions stored on a computer-readable storage medium and executable by processors of one or more computing devices, such as a client device (e.g., a mobile client device) or server device. When executed by the one or more processors, the computer-executable instructions of the image transformation system 706 can cause a computing device to perform the long exposure image generation methods described herein. Alternatively, the components 802-822 can include hardware, such as a special-purpose processing device to perform a certain function or group of functions. In addition, the components 802-822 of the image transformation system 706 can include a combination of computer-executable instructions and hardware.

Furthermore, the components 802-822 of the image transformation system 706 may be implemented as one or more operating systems, as one or more stand-alone applications, as one or more modules of an application, as one or more plug-ins, as one or more library functions or functions that may be called by other applications, and/or as a cloud-computing model. Thus, the components 802-822 may be implemented as a stand-alone application, such as a desktop or mobile application. Additionally, the components 802-822 may be implemented as one or more web-based applications hosted on a remote server. The components 802-822 may also be implemented in a suite of mobile device applications or "apps." To illustrate, the components 902-930 may be implemented in an application, including but not limited to ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Systems Incorporated in the United States and/or other countries.

FIGS. 1-8, the corresponding text, and the examples provide a number of different methods, systems, devices, and non-transitory computer-readable media of the image transformation system 706. In addition to the foregoing, one or more embodiments can also be described in terms of flowcharts comprising acts for accomplishing a particular result, such as the flowcharts of acts shown in FIG. 9. Additionally, the acts described herein may be repeated or performed in parallel with one another or parallel with different instances of the same or similar acts.

Figure 9:
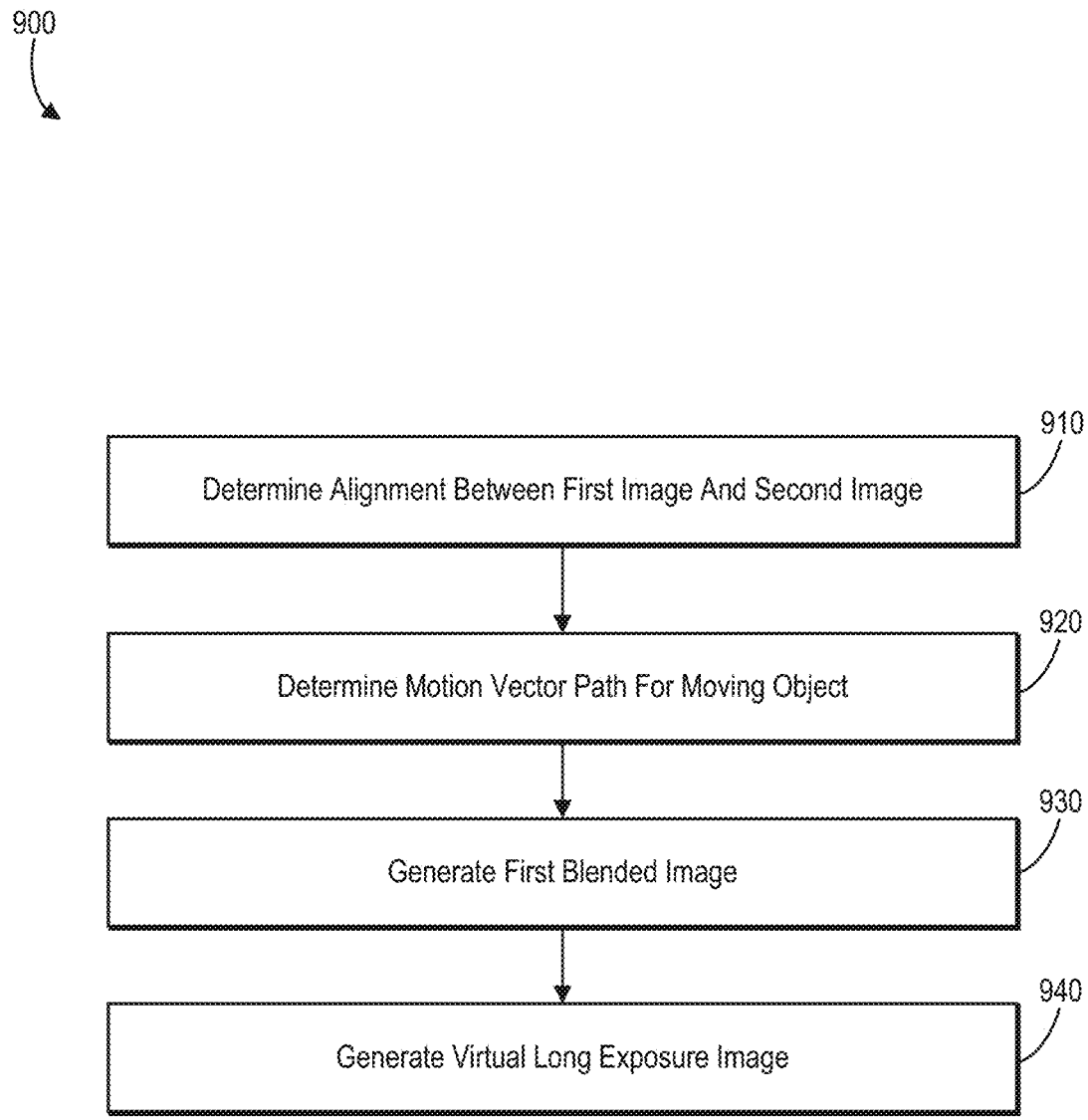
FIG. 9 illustrates a flowchart of a series of acts for generating a virtual long exposure image in accordance with the one or more embodiments.

As mentioned, FIG. 9 illustrates a flowchart of a series of acts 900 for generating a virtual long exposure image using a sequence of short exposure images. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

In one or more embodiments, the series of acts 900 is implemented on one or more computing devices, such as the computing device 800 or the client device 708a. In addition, in some embodiments, the series of acts 900 is implemented in a digital environment for creating or editing digital content (e.g., images).

The series of acts 900 includes an act 910 of determining alignment between a first image and a second image. In particular, the act 910 can involve determining an alignment between a first digital image and a second digital image in a sequence of digital images portraying a moving object. Specifically, the act 910 can include based on a feature-point-deficiency metric, selecting an image-alignment model from a pixel-adjusted-gyroscope-alignment model and a feature-based-alignment model, and applying the selected image-alignment model to the first digital image and the second digital image to determine the alignment between the first digital image and the second digital image.

The series of acts 900 includes an act 920 of determining a motion vector path for a moving object. In particular, the act 920 can involve determining a motion vector path for the moving object based on the first digital image, the second digital image, and the alignment. Specifically, the act 920 can include determining, for each pixel in the moving object, a horizontal motion and a vertical motion between the pixel and a corresponding pixel in the second digital image.

The series of acts 900 also includes an act 930 of generating a first blended image. In particular, the act 930 can involve generating a first blended digital image by blending pixels from the first digital image utilizing the motion vector path. Specifically, the act 930 can include, for a first pixel in the first digital image: identifying a set of pixels from the first digital image along the motion vector path from the first pixel; and blending the set of pixels from the first digital image along the motion vector path to generate a first blended pixel of the first blended digital image. The act 930 can also include averaging pixel values from the set of pixels to generate the first blended pixel.

The series of acts 900 includes an act 940 of generating a virtual long exposure image. In particular, the act 940 can involve generating a virtual long exposure image portraying the moving object in the sequence of digital images based on the first blended digital image.

The series of acts 900 can also include an additional act of determining a second motion vector path for the moving object based on the second digital image and a third digital image in the sequence of digital images; and generating a second blended digital image by blending pixels from the second digital image utilizing the second motion vector path. Specifically, this act further includes causing the computing device to generate the virtual long exposure image portraying the moving object in the sequence of digital images by combining the first blended digital image and the second blended digital image.

Moreover, the virtual long exposure image can comprise a virtual light-painting long exposure image, which includes a step of generating a virtual light-painting long exposure image by: comparing a brightness of a first pixel of the first blended digital image with a brightness of a corresponding pixel of the second blended digital image; based on the comparison, selecting a brightest pixel of the first pixel and the corresponding pixel; and generating a first pixel of the virtual light-painting long exposure image utilizing the selected brightest pixel.

The virtual long exposure image can comprise a virtual rear-sync flash long exposure image which includes a step of generating a virtual rear-sync flash long exposure image by: identifying a last digital image in the sequence of digital images; modifying pixels in the last digital image based on a brightness value of the last digital image; and combining the modified last digital image with the first blended digital image to generate the virtual rear-sync flash long exposure image. Specifically, this act can include modifying the first blended digital image based on the brightness value of the last digital image; and combining the modified last digital image with the modified first blended digital image to generate the virtual rear-sync flash long exposure image.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system.

In addition (or in the alternative) to the acts describe above, in some embodiments, the acts 900 include performing a step for generating a virtual long exposure image of the moving object from the aligned plurality of digital images utilizing a motion vector path of the moving object. For instance, the algorithm and acts described in reference to FIG. 1 can comprise the corresponding acts for performing a step for generating a virtual long exposure image of the moving object from the aligned plurality of digital images utilizing a motion vector path of the moving object. Similarly, the algorithms and acts described in relation to FIGS. 2-5 provide additional detail regarding the acts described in FIG. 1 and can further comprise corresponding acts for performing a step for generating a virtual long exposure image of the moving object from the aligned plurality of digital images utilizing a motion vector path of the moving object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
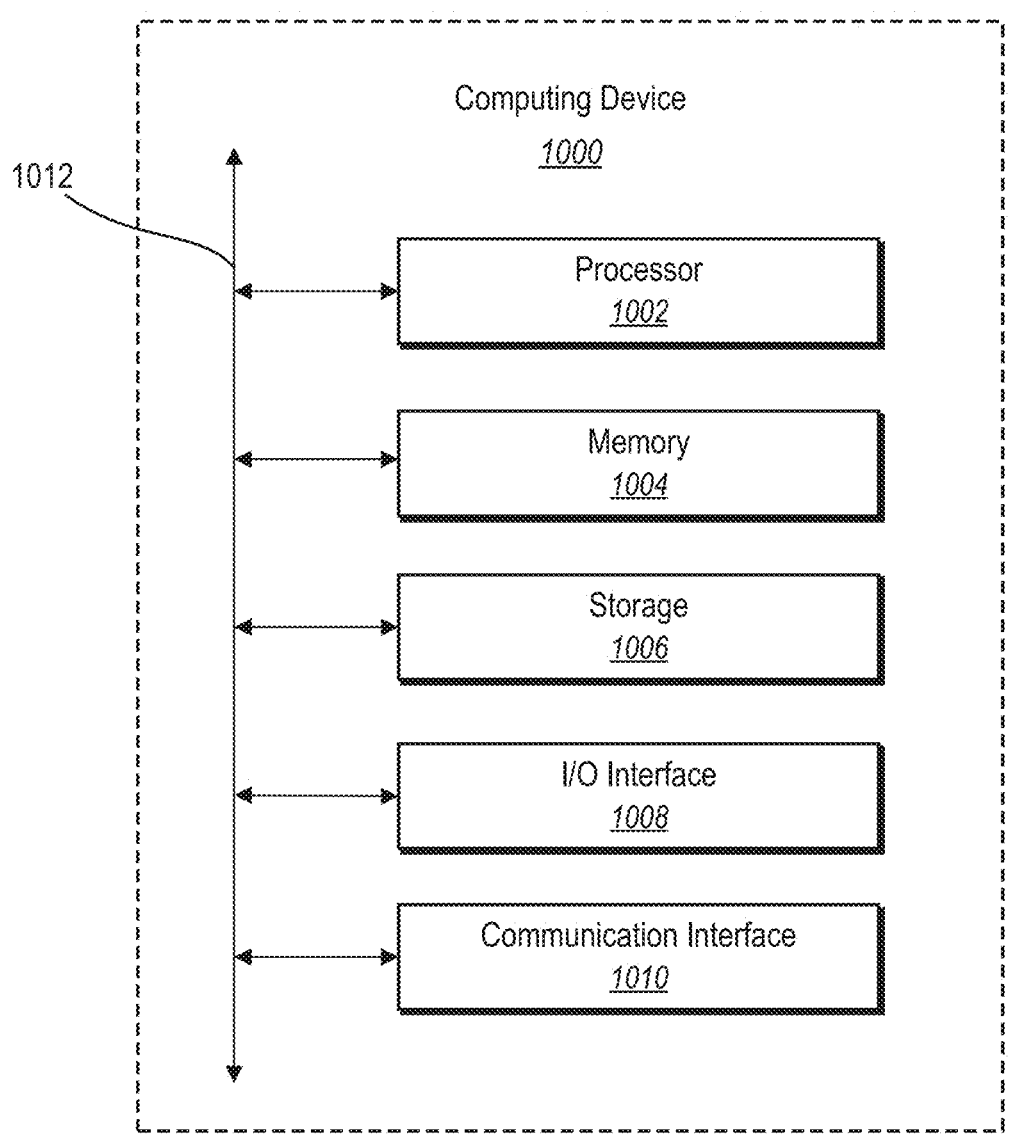
FIG. 10 illustrates a block diagram of an exemplary computing device for implementing one or more embodiments of the present disclosure.

FIG. 10 illustrates a block diagram of an exemplary computing device 1000 that may be configured to perform one or more of the processes described above. One will appreciate that one or more computing devices, such as the computing device 1000 may represent the computing devices described above (e.g., computing device 800, server device(s) 1002, and client devices 1004a-b). In one or more embodiments, the computing device 1000 may be a mobile device (e.g., a laptop, a tablet, a smartphone, a mobile telephone, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to:
   determine an alignment among a sequence of digital images;
   determine, from the alignment, a motion vector path of moving pixels among the sequence of digital images;
   identify, for locations along the motion vector path, respective brightest pixels from portions of digital images within the sequence of digital images corresponding to the motion vector path; and
   generate a virtual long exposure image by blending the sequence of digital images together by combining the brightest pixels from the sequence of digital images for the locations along the motion vector path without blending background pixels not associated with the motion vector path.

2. The non-transitory computer readable medium of claim 1, further comprising instructions that, when executed by the at least one processor, cause the computing device to convert the digital images in the sequence of digital images into grayscale prior to identifying the brightest pixels from the sequence of digital images for the locations along the motion vector path.

3. The non-transitory computer readable medium of claim 1, wherein the moving pixels correspond to a light source whose movement is captured by the sequence of digital images.

4. The non-transitory computer readable medium of claim 1, further comprising instructions that, when executed by the at least one processor, cause the computing device to extract the sequence of digital images from a video.

5. The non-transitory computer readable medium of claim 1, further comprising instructions that, when executed by the at least one processor, cause the computing device to capture the sequence of digital images using a burst mode camera setting.

6. The non-transitory computer readable medium of claim 5, wherein the sequence of digital images are captured without the use of a tripod.

7. The non-transitory computer readable medium of claim 1, further comprising instructions that, when executed by the at least one processor, cause the computing device to determine the alignment among the sequence of digital images by:
   utilizing a feature-based-alignment model to align pixels between consecutive digital images in the sequence of digital images;
   determining a feature-point deficiency; and
   applying a pixel-adjusted-gyroscope-alignment model to align the pixels between consecutive digital images in the sequence of digital images in place of the feature-based-alignment model based on determining the feature-point deficiency.

8. The non-transitory computer readable medium of claim 7, wherein determining the feature-point deficiency comprises determining that a number of feature points within one or more of a set of consecutive digital images in the sequence of digital images does not satisfy a threshold amount of feature points.

9. The non-transitory computer readable medium of claim 1, further comprising instructions that, when executed by the at least one processor, cause the computing device to determine the motion vector path by determining, for each pixel in the motion vector path, a horizontal motion and a vertical motion between consecutive images in the sequence of digital images.

10. A system operable to virtual long exposure digital images, the system comprising:
    a memory comprising a sequence of digital images;
    at least one computing device configured to cause the system to:
       determine an alignment among the sequence of digital images;
       determine a motion vector path of moving pixels among the sequence of digital images utilizing an optical flow technique and the alignment between the sequence of digital images;
       identify, for locations along the motion vector path, respective brightest pixels from portions of digital images within the sequence of digital images corresponding to the motion vector path; and
       generate a virtual long exposure image by blending the sequence of digital images together by combining the brightest pixels from the sequence of digital images for the locations along the motion vector path without blending background pixels not associated with the motion vector path.

11. The system of claim 10, wherein the least one computing device is further configured to cause the system to:
    select an image-alignment model from a pixel-adjusted-gyroscope-alignment model and a feature-based-alignment model; and
    apply the selected image-alignment model to the sequence of digital images to determine the alignment among the sequence of digital images.

12. The system of claim 10, wherein the least one computing device is further configured to cause the system to determine the motion vector path by determining, for each of the moving pixels, a horizontal motion and a vertical motion between consecutive digital images.

13. The system of claim 10, wherein the least one computing device is further configured to cause the system to convert the digital images in the sequence of digital images into grayscale prior to identifying the brightest pixels from the sequence of digital images for the locations along the motion vector path.

14. The system of claim 10, wherein the least one computing device is further configured to cause the system to:
generate a first blended digital image by combining a first pair of consecutive digital images in the sequence of digital images by combining a brightest pixel for each location in the motion vector path from the first pair of consecutive digital images;
generate a second blended digital image by combining a second pair of consecutive digital images in the sequence of digital images by combining a brightest pixel for each location in the motion vector path from the second pair of consecutive digital images; and
generate the virtual long exposure image by blending the sequence of digital images together by combining the first blended digital image and the second blended digital image by combining a brightest pixel for each location in the motion vector path from the first blended digital image and the second blended digital image.

15. The system of claim 10, wherein the least one computing device is further configured to cause the system to identify the brightest pixels from the sequence of digital images for the locations along the motion vector path by comparing a brightness of a pixel at a first location in the motion vector path from each digital image in the sequence of digital images.

16. A method of generating virtual long exposure images comprising:
determining an alignment among a sequence of digital images;
determining, from the alignment a motion vector path of moving pixels among the sequence of digital images;
identifying, for locations along the motion vector path, respective brightest pixels from portions of digital images within the sequence of digital images corresponding to the motion vector path; and
generating a virtual long exposure image by blending the sequence of digital images together by combining the brightest pixels from the sequence of digital images for the locations along the motion vector path without blending background pixels not associated with the motion vector path.

17. The method of claim 16, further comprising converting the digital images in the sequence of digital images into grayscale prior to identifying the brightest pixels from the sequence of digital images for the locations along the motion vector path.

18. The method of claim 16, wherein generating the virtual long exposure image comprises generating a virtual light-painting long exposure image.

19. The method of claim 16, wherein determining the alignment between the sequence of digital images comprises:
utilizing a feature-based-alignment model to align pixels between consecutive digital images in the sequence of digital images;
determining a feature-point deficiency; and
applying a pixel-adjusted-gyroscope-alignment model to align pixels between consecutive digital images in the sequence of digital images in place of the feature-based-alignment model based on determining the feature-point deficiency.

20. The method of claim 16, wherein determining the motion vector path comprises determining, for each pixel in the motion vector path, a horizontal motion and a vertical motion between consecutive images in the sequence of digital images utilizing an optical flow technique.

* * * * *